United States Patent
Wu et al.

(10) Patent No.: US 10,397,835 B2
(45) Date of Patent: *Aug. 27, 2019

(54) METHOD, APPARATUS, AND SYSTEM FOR VOICE CALL FALLBACK TO CIRCUIT SWITCHED DOMAIN

(71) Applicant: HUAWEI TECHNOLOGIES CO.,LTD., Shenzhen, Guangdong (CN)

(72) Inventors: Xiaobo Wu, Shanghai (CN); Hai Liu, Shanghai (CN); Wei Xiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,390

(22) Filed: May 3, 2017

(65) Prior Publication Data

US 2017/0353894 A1    Dec. 7, 2017

Related U.S. Application Data

(63) Continuation of application No. 13/930,593, filed on Jun. 28, 2013, now Pat. No. 9,648,522, which is a
(Continued)

(30) Foreign Application Priority Data

Jul. 23, 2009    (CN) .......................... 2009 1 0159934
Nov. 10, 2009    (CN) .......................... 2009 1 0211439

(51) Int. Cl.
*H04W 36/00*    (2009.01)
*H04W 68/00*    (2009.01)
(Continued)

(52) U.S. Cl.
CPC .......... *H04W 36/0022* (2013.01); *H04W 8/26* (2013.01); *H04W 36/14* (2013.01);
(Continued)

(58) Field of Classification Search
None
See application file for complete search history.

(56) References Cited

U.S. PATENT DOCUMENTS 8,284,701 B2    10/2012    Vikberg et al.
8,320,291 B2    11/2012    Rune et al.
(Continued)

FOREIGN PATENT DOCUMENTS

CN    101291537 A    10/2008
CN    101400090 A    4/2009
(Continued)

OTHER PUBLICATIONS

3GPP TS 23.216 V9.0.0 (Jun. 2009),3rd Generation Partnership Project;Technical Specification Group Services and System Aspects;Single Radio Voice Call Continuity (SRVCC);Stage 2(Release 9),total 39 pages.
(Continued)

*Primary Examiner* — Candal Elpenord
(74) *Attorney, Agent, or Firm* — David William Roe

(57) ABSTRACT

A method for voice call fallback to a circuit switched (CS) domain disclosed in the present invention includes: receiving a Service Request message from a calling user equipment (UE), where the Service Request message includes called number information of a voice call in a CS domain, instructing an evolved NodeB (eNB) to initiate circuit switched fallback (CSFB) handover; receiving a Handover Request message from the eNB, where the Handover Request message includes information required for CS handover, selecting a mobile switching center (MSC) and
(Continued)

sending a packet switched (PS) to CS Handover Request message to the MSC, where the PS to CS Handover Request message carries information required for the CS handover and a called number so that the MSC calls a called UE. The corresponding apparatuses and systems are also disclosed. The technical solution of the present invention can reduce the connection delay.

15 Claims, 23 Drawing Sheets

Related U.S. Application Data continuation of application No. 13/356,201, filed on Jan. 23, 2012, now Pat. No. 8,504,043, which is a continuation of application No. PCT/CN2010/075270, filed on Jul. 20, 2010.

(51) Int. Cl.
*H04W 8/26* (2009.01)
*H04W 36/14* (2009.01)
*H04W 76/02* (2009.01)
*H04W 72/04* (2009.01)
*H04W 76/10* (2018.01)

(52) U.S. Cl.
CPC .......... *H04W 68/00* (2013.01); *H04W 72/042* (2013.01); *H04W 76/10* (2018.02)

(56) References Cited

U.S. PATENT DOCUMENTS

| | | | |
|---|---|---|---|
| 8,520,596 B2 | 8/2013 | Diachina et al. | |
| 8,537,748 B2 | 9/2013 | Witzel et al. | |
| 8,792,417 B2* | 7/2014 | Yeoum | H04W 92/02 310/331 |
| 9,271,198 B2 | 2/2016 | Pehrsson et al. | |
| 2003/0002525 A1 | 1/2003 | Grilli et al. | |
| 2003/0026245 A1 | 2/2003 | Ejzak | |
| 2008/0267128 A1 | 10/2008 | Bennett et al. | |
| 2009/0270097 A1 | 10/2009 | Gallagher et al. | |
| 2010/0098023 A1 | 4/2010 | Aghili et al. | |
| 2010/0272025 A1 | 10/2010 | Yu | |
| 2010/0279691 A1 | 11/2010 | Dwyer et al. | |
| 2010/0302937 A1* | 12/2010 | Hu | H04W 76/18 370/225 |
| 2010/0309886 A1 | 12/2010 | Vikberg et al. | |
| 2010/0317315 A1 | 12/2010 | Burbidge et al. | |
| 2010/0317378 A1 | 12/2010 | Fang et al. | |
| 2011/0299429 A1 | 12/2011 | Tiwari | |
| 2012/0039303 A1 | 2/2012 | Stenfelt et al. | |
| 2012/0122459 A1 | 5/2012 | Wu et al. | |
| 2013/0094472 A1 | 4/2013 | Klingenbrunn et al. | |
| 2014/0051443 A1 | 2/2014 | Diachina et al. | |

FOREIGN PATENT DOCUMENTS

| | | |
|---|---|---|
| CN | 101472349 A | 7/2009 |
| CN | 101483896 A | 7/2009 |
| CN | 101489288 A | 7/2009 |
| CN | 101816206 A | 8/2010 |
| EP | 1081971 A1 | 3/2001 |
| EP | 1983796 A1 | 10/2008 |
| RU | 2323544 C2 | 4/2008 |
| WO | 2008081310 A1 | 7/2008 |
| WO | 2008125329 A1 | 10/2008 |
| WO | 2009000315 A1 | 12/2008 |
| WO | 2009022860 A1 | 2/2009 |
| WO | 2013172656 A1 | 11/2013 |

OTHER PUBLICATIONS

3GPP TS 23.271 V9.0.0 (Jun. 2009),3rd Generation Partnership Project;Technical Specification Group Services and System Aspects;Functional stage 2 description of Location Services (LCS)(Release 9),total 164 pages.
3GPP TS 23.272 V8.4.0 (Jun. 2009),3rd Generation Partnership Project;Technical Specification Group Services and System Aspects;Circuit Switched Fallback in Evolved Packet System;Stage 2(Release 8),total 48 pages.
3GPP TS 23.292 V91.0 (Jun. 2009),3rd Generation Partnership Project;Technical Specification Group Services and System Aspects;IP Multimedia Subsystem (IMS) centralized services;Stage 2(Release 9),total 105 pages.
3GPP TS 23.401 V9.1.0 (Jun. 2009),3rd Generation Partnership Project;Technical Specification Group Services and System Aspects;General Packet Radio Service (GPRS) enhancements for Evolved Universal Terrestrial Radio Access Network (E-UTRAN) access(Release 9),total 234 pages.
3GPP TS 33.401 V9.0.0 (Jun. 2009),3rd Generation Partnership Project;Technical Specification Group Services and System Aspects;3GPP System Architecture Evolution (SAE):Security architecture;(Release 9),total 99 pages.
3GPP TS 48.008 V8.7.0 (May 2009),3rd Generation Partnership Project:Technical Specification Group GSM/EDGE Radio Access Network;Mobile Switching Centre—Base Station System(MSC-BSS) interface;Layer 3 specification (Release 8),total 208 pages.
3GPP TS 48.018 V8.3.0 (May 2009),3rd Generation Partnership Project:Technical Specification Group GSM/EDGE Radio Access Network;General Packet Radio Service (GPRS);Base Station System (BSS)—Serving GPRS Support Node (SGSN);BSS GPRS Protocol (BSSGP)(Release 8),total 169 pages.
XP040278941 3GPP TR 23.879 V1.0.0 (Jan. 2007),3rd Generation Partnership Project;Technical Specification Group Services and System Aspects;Study on Circuit Switched (CS) domain services over evolved Packet Switched (PS) access;Stage 2(Release 8),Dec. 31, 2007, total 40 pages.
"3GPP TS 36.413 V8.6.1, 3rd Generation Partnership Project; Technical Specification Group Radio Access Network; Evolved Universal Terrestrial Radio Access Network (E-UTRAN); S1 Application Protocol (S1AP)(Release 8), Jun. 2009, 218 pages".
"3GPP TS 23.216 V8.4.0 (Jun. 2009), 3rd Generation Partnership Project; Technical Specification Group Services and System Aspects;Single Radio Voice Call Continuity (SRVCC);Stage 2(Release 8), 35 pages".

* cited by examiner

METHOD, APPARATUS, AND SYSTEM FOR VOICE CALL FALLBACK TO CIRCUIT SWITCHED DOMAIN

CROSS-REFERENCE TO RELATED APPLICATIONS

This application is a continuation of U.S. patent application Ser. No. 13/930,593, filed on Jun. 28, 2013, which is a continuation of U.S. patent application Ser. No. 13/356,201 filed on Jan. 23, 2012, now U.S. Pat. No. 8,504,043, which is a continuation of International Patent Application No. PCT/CN2010/075270, filed on Jul. 20, 2010. The International Patent Application claims priority to Chinese Patent Application No. 200910211439.8, filed on Nov. 10, 2009, which claims priority to Chinese Patent Application No. 200910159934.9, filed on Jul. 23, 2009. The aforementioned patent applications are hereby incorporated by reference in their entireties.

FIELD OF THE INVENTION

The present invention relates to communication technologies, and in particular, to a method, an apparatus, and a system for voice call fallback to a circuit switched (CS) domain.

BACKGROUND OF THE INVENTION

The 2nd generation/3rd generation (2G/3G, 2nd Generation/3rd Generation) mobile communication networks have been deployed for many years, and may be regarded to have full coverage to some extent. With the development of the system architecture evolution/long term evolution (SAE/LTE, System Architecture Evolution) network, high speed packet access (HSPA, High Speed Packet Access) network, enhanced HSPA (HSPA+) network, and worldwide interoperability for microwave access (WiMAX, Worldwide Interoperability for Microwave Access) network, these networks have covered some urban areas and heavy traffic areas, and coexist with the 2G/3G networks among the current communication networks. For better description, networks providing only packet switched (PS) domain, for example, SAE/LTE, HSPA, HSPA+, and WiMAX networks, are hereinafter referred to as PS domain-only networks.

With respect to different network bearer mechanisms, mobile communication services may be categorized into the following services:

1. services carried in Circuit Switched (CS, Circuit Switched) domain, for example, voice telephone service, short message service, and supplementary service.
2. services carried in Packet Switched (PS, Packet Switched) domain, including a data service and a session service, where the session service is also known as a voice over Internet Protocol (VoIP, Voice over Internet Protocol) service.

Voice services may be carried in the CS domain or PS domain. In an LTE network, different solutions are proposed to provide voice services according to different network deployment scenarios and requirements of operators. For an LTE network without an IP multimedia subsystem (IMS), a circuit switched fallback (CSFB, Circuit Switched FallBack) technology is used. The technology is described in detail in the following.

An operator may use a 2G/3G network to provide voice services for users, and use an LTE network to provide data services for users. A user equipment (UE, User Equipment) is a multi-mode terminal. However, due to complexity of implementation and high cost, most UEs cannot receive and send LTE signals and 2G/3G signals simultaneously. There is two applying scenarios in the following: 1. A UE performs a data service or is in an idle state in an LTE network, and wants to initiate a CS voice call. And the radio module of the UE needs to be tuned from the LTE network to the 2G/3G network, and then the UE initiates a voice call in the 2G/3G network. This call is referred to as a UE-initiated call. 2. A UE performs a data service or is in an idle state in an LTE network, and a user wants to call the UE. And the LTE network needs to notify the UE that a CS call arrives, and the UE can tune the radio module to the 2G/3G network to receive the CS call according to the notification. This call is referred to as a UE-called call.

SUMMARY OF THE INVENTION

Embodiments of the present invention provide a method, an apparatus, and a system for voice call fallback to a circuit switched domain to reduce the connection delay.

Embodiments of the present invention are implemented by the following technical solution:

A method for voice call fallback to a CS domain includes:

receiving a Service Request message from a calling UE, where the Service Request includes called number information of a voice call in a CS domain, instructing an evolved NodeB (eNB) to initiate circuit switched fallback (CSFB) handover;

receiving a Handover Request message from the eNB, where the Handover Request message includes information required for CS handover, selecting a mobile switching center (MSC) and sending a PS to CS Handover Request message to the MSC, where the PS to CS Handover Request message includes information required for the CS handover and a called number so that the MSC calls a called UE; and receiving a PS to CS Handover Response message returned by the MSC, where the PS to CS Handover Response message includes CS resource information prepared by a target base station subsystem/radio network subsystem (BSS/RNS), and sending a Handover Command message to the calling UE through the eNB, where the Handover Command message includes the CS resource information prepared by the target BSS/RNS so that the calling UE can access a 2G/3G network.

Another method for voice call fallback to a CS domain includes:

receiving a PS to CS Handover Request message from a mobility management entity (MME), where the PS to CS Handover Request message includes information required for CS handover and a called number, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB; and sending an Initial Address Message (IAM) to call a called UE according to the called number, obtaining CS resource information prepared by a target BSS/RNS from the target BSS/RNS, and returning a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the calling UE can access a 2G/3G network.

Another method for voice call fallback to a CS domain includes:

when receiving a CS Paging Request message from an MSC, sending a CS Paging Request message to a called UE through an eNB;

receiving a Service Request message from the called UE, determining that the called UE accepts the call, and instructing the eNB to initiate CSFB handover;

receiving a Handover Request message from the eNB, where the Handover Request message includes information required for CS handover, selecting an MSC and sending a PS to CS Handover Request message to the MSC, where the PS to CS Handover Request message includes information required for the CS handover so that the MSC returns an Address Complete Message (ACM) to a calling UE; and receiving a PS to CS Handover Response message returned by the MSC, where the PS to CS Handover Response message includes CS resource information prepared by a target BSS/RNS, and sending a Handover Command message to the called UE through the eNB, where the Handover Command message includes the CS resource information prepared by the target BSS/RNS so that the called UE accesses a 2G/3G network.

Another method for voice call fallback to a CS domain includes:

after receiving an incoming call, sending a CS Paging Request message to an MME so that the MME sends a CS Paging message to a called UE;

receiving a PS to CS Handover Request message from the MME, where the PS to CS Handover Request message includes information required for CS handover, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB; and sending an ACM to a calling UE according to the PS to CS Handover Request message, obtaining CS resource information prepared by a target BSS/RNS from the target BSS/RNS, and returning a PS to CS Handover Response message to the MME, where the PS to CS Handover Response message includes the CS resource information prepared by the target BSS/RNS so that the MME sends a Handover Command message to the called UE through an eNB, where the Handover Command message includes the CS resource information prepared by the target BSS/RNS so that the called UE accesses a 2G/3G network.

Another method for voice call fallback to a CS domain includes:

receiving a PS Handover Request message from an eNB, where the PS Handover Request message includes information required for PS handover; and according to the information required for the PS handover in the PS Handover Request message, determining that a new MSC to be accessed by a called UE is different from an MSC where the called UE is currently registered, and sending a Location Update message to the new MSC so that the new MSC sends a Location Update message to a home location register (HLR) for executing a location update procedure and a roaming retry procedure.

Another method for voice call fallback to a CS domain includes:

when receiving a CS Paging Request message from an MSC, sending a CS Paging Request message to a called UE through an eNB;

receiving a Service Request message from the called UE, and sending a CS Service Indication message to the called UE, where the CS Service Indication message includes a calling number;

receiving a Service Request message from the called UE, where the Service Request message includes indication information indicating whether to accept a call; and if the called UE accepts the call, instructing the eNB to initiate CSFB handover or instructing the called UE to initiate a CSFB call.

Embodiments of the present invention further provide the following MMEs.

An MME includes:

a first receiving unit, configured to receive a Service Request message from a calling UE, where the Service Request message includes called number information of a voice call in a CS domain;

a first sending unit, configured to instruct an eNB to initiate CSFB handover when the first receiving unit receives the Service Request message from the calling UE;

a second receiving unit, configured to receive a Handover Request message from the eNB, where the Handover Request message includes information required for CS handover;

a first selecting unit, configured to select an MSC after the second receiving unit receives the Handover Request message from the eNB;

a second sending unit, configured to send a PS to CS Handover Request message to the MSC selected by the first selecting unit, where the PS to CS Handover Request message includes information required for the CS handover and a called number so that the MSC calls a called UE;

a third receiving unit, configured to receive a PS to CS Handover Response message returned by the MSC, where the PS to CS Handover Response message includes CS resource information prepared by a target BSS/RNS; and a third sending unit, configured to send a Handover Command message to the calling UE through the eNB, where the Handover Command message includes the CS resource information prepared by the target BSS/RNS so that the calling UE can access a 2G/3G network.

Another MME includes:

a fifth receiving unit, configured to receive a CS Paging Request message from an MSC;

a fifth sending unit, configured to send a CS Paging Request message to a called UE through an eNB when the fifth receiving unit receives the CS Paging Request message from the MSC;

a sixth receiving unit, configured to receive a Service Request message from the called UE;

a determining unit, configured to determine that the called UE accepts the call when the sixth receiving unit receives the Service Request message from the called UE;

a sixth sending unit, configured to send a message instructing the eNB to initiate CSFB handover;

a seventh receiving unit, configured to receive a Handover Request message from the eNB, where the Handover Request message includes information required for CS handover;

a second selecting unit, configured to select an MSC when the seventh receiving unit receives the Handover Request message from the eNB;

a seventh sending unit, configured to send a PS to CS Handover Request message to the MSC selected by the second selecting unit, where the PS to CS Handover Request message includes information required for the CS handover so that the MSC returns an ACM to a calling UE;

an eighth receiving unit, configured to receive a PS to CS Handover Response message returned by the MSC, where the PS to CS Handover Response message includes CS resource information prepared by a target BSS/RNS; and an eighth sending unit, configured to send a Handover Command message to the called UE through the eNB when the eighth receiving unit receives the PS to CS Handover Response message, where the Handover Command message includes the CS resource information prepared by the target BSS/RNS so that the calling UE can access a 2G/3G network.

Another MME includes:

a tenth receiving unit, configured to receive a PS Handover Request message from an eNB, where the PS Handover Request message includes information required for PS handover;

a determining unit, configured to determine that a new MSC to be accessed by a called UE is different from an MSC where the called UE is currently registered according to the information required for the PS handover; and a tenth sending unit, configured to send a Location Update message to the new MSC when the determining unit determines that the new MSC to be accessed by the called UE is different from the MSC where the called UE is currently registered, so that the new MSC sends a Location Update message to an HLR for executing a location update procedure and a roaming retry procedure.

Embodiments of the present invention further provide the following MSCs.

An MSC includes:

an eleventh receiving unit, configured to receive a PS to CS Handover Request message from an MME, where the PS to CS Handover Request message includes information required for CS handover and a called number, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB;

an eleventh sending unit, configured to send an IAM for calling a called UE according to the called number;

a first resource information obtaining unit, configured to obtain CS resource information prepared by a target BSS/RNS according to the information required for the CS handover; and a twelfth sending unit, configured to return a PS to CS Handover Response message to the MME, and return the CS resource information obtained by the first resource information obtaining unit to the MME so that the MME sends a Handover Command message to a calling UE through an eNB, where the Handover Command message includes the CS resource information prepared by the target BSS/RNS so that the calling UE can access a 2G/3G network.

Another MSC includes:

a thirteenth receiving unit, configured to receive an incoming call;

a fourteenth sending unit, configured to send a CS Paging Request message to an MME when the thirteenth receiving unit receives the incoming call so that the MME sends a CS Paging message to a called UE;

a fourteenth receiving unit, configured to receive a PS to CS Handover Request message from the MME, where the PS to CS Handover Request message includes information required for CS handover, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB;

a fifteenth sending unit, configured to send an ACM to a calling UE according to the PS to CS Handover Request message;

a second resource information obtaining unit, configured to obtain CS resource information prepared by a target BSS/RNS according to the information required for the CS handover; and a sixteenth sending unit, configured to return a PS to CS Handover Response message to the MME, and return the CS resource information obtained by the second resource information obtaining unit to the MME so that the MME sends a Handover Command message to the called UE through an eNB, where the Handover Command message includes the CS resource information prepared by the target BSS/RNS so that the called UE accesses a 2G/3G network.

Embodiments of the present invention further provide the following communication systems.

A communication system includes an MME, an eNB and an MSC, where:

the MME, configured to: receive a Service Request message from a calling UE, where the Service Request message includes called number information of a voice call in a CS domain, and send the eNB a message instructing the eNB to initiate CSFB handover; receive a Handover Request message from the eNB, where the Handover Request message carries information required for CS handover, select an MSC, and send a PS to CS Handover Request message to the MSC, where the PS to CS Handover Request message includes information required for the CS handover and a called number; receive a PS to CS Handover Response message returned by the MSC, where the PS to CS Handover Response message carries CS resource information prepared by a target BSS/RNS, and send a Handover Command message to the calling UE through the eNB, where the Handover Command message carries the CS resource information prepared by the target BSS/RNS so that the calling UE can access a 2G/3G network;

the eNB, configured to: receive a message instructing the eNB to initiate CSFB handover from the MME, send a Handover Request message to the MME, where the Handover Request message includes information required for CS handover, and receive a Handover Command message from the MME and forward the Handover Command message to a calling UE, where the Handover Command message includes CS resource information prepared by a target BSS/RNS so that the calling UE can access a 2G/3G network; and the MSC, configured to: receive a PS to CS Handover Request message from the MME, where the PS to CS Handover Request message includes information required for the CS handover and a called number, send an IAM to call a called UE according to the called number, obtain CS resource information prepared by a target BSS/RNS according to the information required for the CS handover, and return a PS to CS Handover Response message to the MME, where the PS to CS Handover Response message includes the CS resource information prepared by the target BSS/RNS.

Another communication system includes an MME, an eNB and an MSC, where:

the MME, configured to: send a CS Paging Request message to a called UE through an eNB when receiving a CS Paging Request message from an MSC; receive a Service Request message from the called UE, where the Service Request message includes called number information of a voice call in a CS domain, and send the eNB a message instructing the eNB to initiate CSFB handover; receive a Handover Request message from the eNB, where the Handover Request message includes information required for CS handover, select an MSC, and send a PS to CS Handover Request message to the MSC, where the PS to CS Handover Request message includes information required for the CS handover so that the MSC returns an ACM to a calling UE; receive a PS to CS Handover Response message returned by the MSC, where the PS to CS Handover Response message includes CS resource information prepared by a target BSS/RNS, and send a Handover Command message to the called UE through the eNB, where the Handover Command message includes the CS resource information prepared by the target BSS/RNS so that the called UE accesses a 2G/3G network;

the eNB, configured to: receive a message instructing the eNB to initiate CSFB handover from the MME, send a Handover Request message to the MME, where the Handover Request message includes information required for CS handover, and receive a Handover Command message from the MME and forward the Handover Command message to the called UE, where the Handover Command message includes CS resource information prepared by a target BSS/RNS so that the called UE accesses a 2G/3G network; and the MSC, configured to: receive a PS to CS Handover Request message from the MME, where the PS to CS Handover Request message includes information required for the CS handover, send an ACM to a calling UE, obtain CS resource information prepared by a target BSS/RNS according to the information required for the CS handover, and return a PS to CS Handover Response message to the MME, where the PS to CS Handover Response message includes CS resource information prepared by a target BSS/RNS.

Another method for voice call fallback to a CS domain includes:

receiving a first message from a UE, where the first message includes Session Initiation Protocol (SIP) context information of the UE;

receiving a Handover Request message from an eNB, where the Handover Request message includes information required for CS handover, and sending a PS to CS Handover Request message to an MSC, where the PS to CS Handover Request message includes the information required for the CS handover and the SIP context information of the UE so that the MSC sets up a bearer from a media gateway (MGW) to a serving gateway/packet data network gateway (SGW/PGW) by using the SIP context information of the UE, and transmits SIP signaling and media streams on the bearer; and receiving a PS to CS Handover Response message returned by the MSC, where the PS to CS Handover Response message includes CS resource information prepared by a target BSS/RNS, and sending a Handover Command message to the UE through the eNB, where the Handover Command message includes the CS resource information prepared by the target BSS/RNS so that the UE can access a 2G/3G network.

Another method for voice call fallback to a CS domain includes:

receiving a PS to CS Handover Request message from an MME, where the PS to CS Handover Request message carries information required for CS handover and SIP context information of a UE;

setting up a bearer from an MGW to an SGW/PGW by using the SIP context information of the UE so that SIP signaling and media streams can be transmitted on the bearer; and obtaining CS resource information prepared by a target BSS/RNS from the target BSS/RNS, and returning a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the UE can access a 2G/3G network.

Another MME includes:

a seventeenth receiving unit, configured to receive a first message from a UE, where the first message includes SIP context information of the UE;

an eighteenth receiving unit, configured to receive a Handover Request message from an eNB, where the Handover Request message includes information required for CS handover;

a nineteenth sending unit, configured to send a PS to CS Handover Request message to an MSC, where the PS to CS Handover Request message includes the information required for the CS handover and the SIP context information of the UE so that the MSC sets up a bearer from an MGW to an SGW/PGW by using the SIP context information of the UE, and transmits SIP signaling and media streams on the bearer;

a nineteenth receiving unit, configured to receive a PS to CS Handover Response message returned by the MSC, where the PS to CS Handover Response message includes CS resource information prepared by a target BSS/RNS; and a twentieth sending unit, configured to send a Handover Command message to the UE through the eNB, where the Handover Command message includes the CS resource information prepared by the target BSS/RNS so that the UE can access a 2G/3G network.

Another MSC includes:

a sixteenth receiving unit, configured to receive a PS to CS Handover Request message from an MME, where the PS to CS Handover Request message includes information required for CS handover and SIP context information of a UE, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB;

a bearer setting up unit, configured to set up a bearer from an MGW to an SGW/PGW by using the SIP context information of the UE so that SIP signaling and media streams can be transmitted on the bearer; and an eighteenth sending unit, configured to obtain CS resource information prepared by a target BSS/RNS from the target BSS/RNS, and return a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the UE can access a 2G/3G network.

Another communication system includes an MME and an MSC, where:

the MME, configured to: receive a first message from a UE, where the first message includes SIP context information of the UE; receive a Handover Request message from an eNB, where the Handover Request message includes information required for CS handover, and send a PS to CS Handover Request message to the MSC, where the PS to CS Handover Request message includes the information required for the CS handover and the SIP context information of the UE; receive a PS to CS Handover Response message returned by the MSC, where the PS to CS Handover Response message includes CS resource information prepared by a target BSS/RNS, and send a Handover Command message to the UE through the eNB, where the Handover Command message includes the CS resource information prepared by the target BSS/RNS so that the UE can access a 2G/3G network;

the MSC, configured to: receive a PS to CS Handover Request message from the MME, where the PS to CS Handover Request message includes information required for CS handover and SIP context information of the UE, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB; set up a bearer from an MGW to an SGW/PGW by using the SIP context information of the UE so that SIP signaling and media streams can be transmitted on the bearer; obtain CS resource information prepared by a target BSS/RNS from the target BSS/RNS, and return a PS to CS Handover Response message to the MME, where the PS to CS Handover Response message includes the CS resource information prepared by the target BSS/RNS.

In a technical solution provided in an embodiment of the present invention, with respect to a calling UE, when receiving a Service Request message carrying called number information of a voice call in a CS domain from the calling UE, an MME directly instructs an eNB to initiate CSFB handover; when receiving a Handover Request message from the eNB, the MME selects an MSC and sends a PS to CS Handover Request message to the MSC, where the PS to CS Handover Request message includes information required for CS handover and a called number so that the MSC calls a called UE; after receiving a PS to CS Handover Response message returned by the MSC, the MME sends a Handover Command message to the calling UE through the eNB, where the Handover Command message includes CS resource information prepared by a target BSS/RNS and returned by the PS to CS Handover Response message so that the calling UE can access a 2G/3G network. Obviously, in this process, an access process of the UE is completed by CS handover, and the CS handover process and the process of the CS core network calling the called UE are executed in parallel. In this way, the delay is reduced and the user experience is improved.

With respect to a called UE, when receiving a CS Paging Request message from an MSC, an MME sends a CS Paging Request message to the called UE through an eNB; when receiving a Service Request message from the called UE, the MME determines that the called UE accepts the call, and instructs the eNB to initiate CSFB handover; when receiving a Handover Request message from the eNB, the MME selects an MSC and sends a PS to CS Handover Request message to the MSC, where the PS to CS Handover Request message includes information required for CS handover so that the MSC responds to the call of a calling UE; when receiving a PS to CS Handover Response message returned by the MSC, the MME provides CS resource information prepared by a target BSS/RNS and included in the PS to CS Handover Response message for the called UE by sending a Handover Command message to the called UE through the eNB so that the called UE accesses a 2G/3G network. In this process, an access process of the UE is completed by CS handover, and the CS handover process and the processing of the CS core network are executed in parallel. In this way, the delay is reduced and the user experience is improved.

In another technical solution provided in an embodiment of the present invention, when receiving a PS Handover Request message from an eNB, and determining that a new MSC to be accessed by a called UE is different from an MSC where the called UE is currently registered according to information required for PS handover included in the PS Handover Request message, an MME sends a Location Update message to the new MSC so that the new MSC sends a Location Update message to an HLR and executes a location update procedure and a roaming retry procedure. The roaming retry procedure is triggered upon receiving a PS Handover Request message sent by the eNB and is executed when determining that the new MSC to be accessed by the called UE is different from the MSC where the called UE is currently registered, namely, the roaming retry procedure and the PS handover procedure are executed in parallel. Therefore, the delay is reduced and the user experience is improved.

In another technical solution provided in an embodiment of the present invention, when a UE needs to be handed over to a 2G/3G network, the UE reports its SIP context information, and an MME sends the information to an MSC; the MSC may set up a bearer from an MGW to an SGW/PGW by using the SIP context of the UE, so that a transmission path between a CS domain and an IMS domain is set up. In this way, after accessing the 2G/3G network, the UE may directly transmit its data streams and SIP signaling by using the bearer from the MGW to the SGW/PGW set up by the MSC. Compared with the existing method for call fallback to a CS domain, the technical solution may greatly reduce the delay and improve the user experience.

BRIEF DESCRIPTION OF THE DRAWINGS

To better explain the technical solution provided in embodiments of the present invention or in the prior art, the accompanying drawings required in the description of the embodiments or the prior art are briefly described in the following. It is apparent that the accompanying drawings illustrate only some exemplary embodiments of the present invention. Those skilled in the art may also derive other drawings from these drawings without any creative effort.

DETAILED DESCRIPTION OF THE EMBODIMENTS

In embodiments of the present invention, two delays may be defined to represent experience of the caller and the called party respectively. The period from a caller dialing a called number to hearing a ring back tone (RBT) is referred to as calling connection time, and has great significance for the caller experience. The longer the time is, the poorer the caller experience is. The period from a called party pressing the answer key to hearing the voice of the caller is referred to as called connection time, and has great significance for the experience of the called party. The longer the time is, the poorer the experience of the called party is.

To enable those skilled in the art have a better understanding of the present invention, a procedure for voice call fallback to a CS domain is described in the following.

When a UE is attached to an LTE network, an MME also attaches the UE to an MSC.

Figure 1:
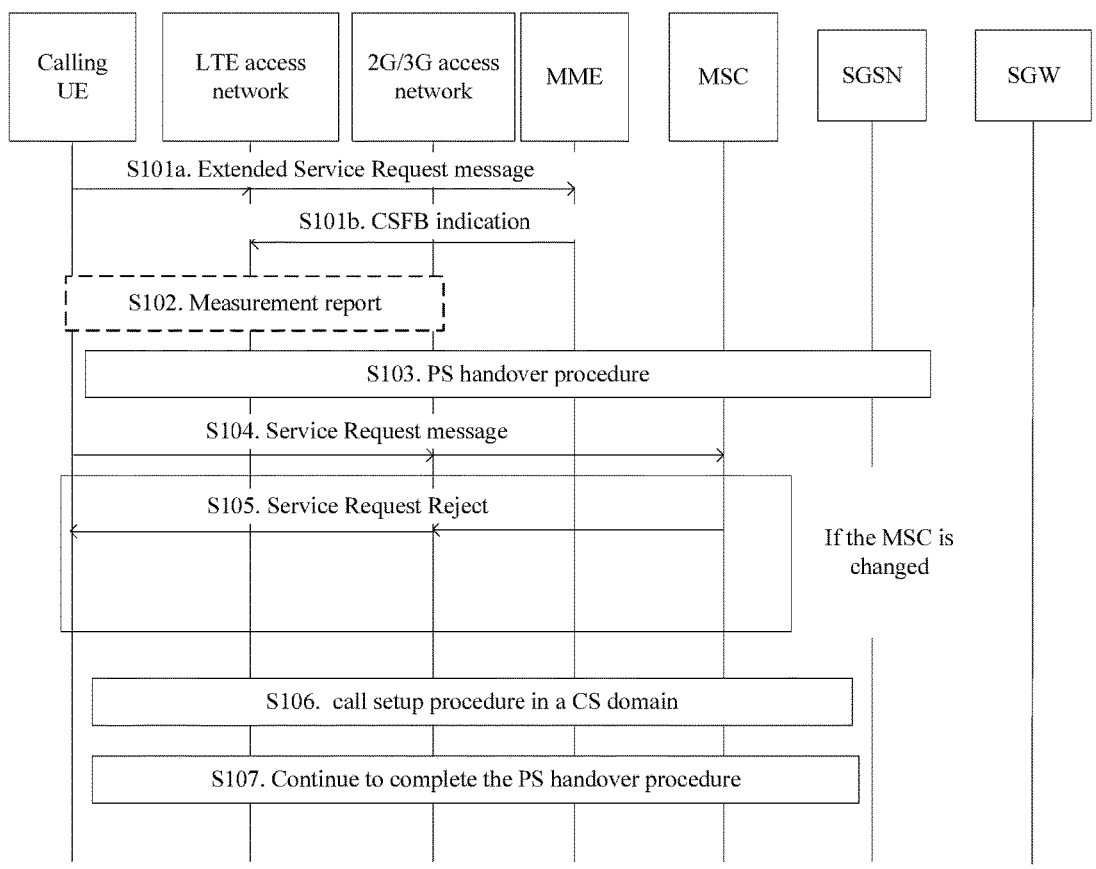
FIG. 1 is a flowchart showing a method for voice call fallback to a CS domain in a scenario where a UE initiates a call.

A method for voice call fallback to a CS domain in a scenario where a UE initiates a call is described in the following. As shown in FIG. 1, the method includes the following steps, where the steps marked with dashed lines are optional.

S101*a*. A calling UE notifies an MME through an Extended Service Request message that the calling UE wants to initiate a CS call.

S101*b*. The MME instructs an eNB that the calling UE wants to initiate a CS call.

S102. Optionally, the eNB requires the calling UE to measure a 2G/3G network, and the calling UE reports a measurement result.

S103. The calling UE executes PS handover to the 2G/3G network to keep continuity of a PS data service.

S104. The calling UE tunes its radio module to the 2G/3G network, and sends a CS Service Request message to a CS network.

S105. Optionally, if the MSC that processes the call is changed and is different from the MSC that the calling UE is attached to, the MSC returns a Service Request Reject message to the UE through the 2G/3G access network.

When receiving a Service Request Reject message returned by the MSC, the UE my reinitiate a location update procedure to attach to the changed MSC.

S106. The calling UE starts to initiate a CS call.

S107. The calling UE completes PS handover.

Figure 2:
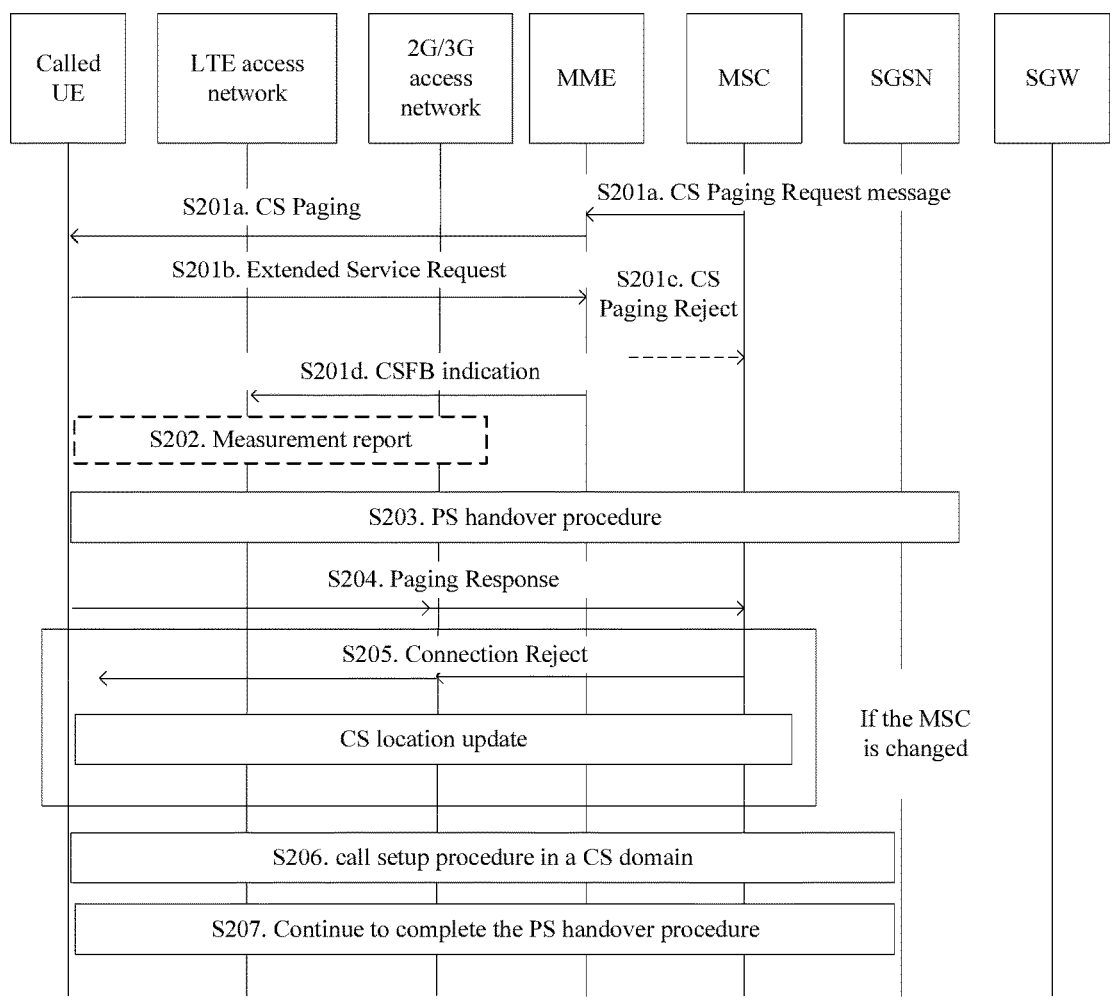
FIG. 2 is a flowchart showing a method for voice call fallback to a CS domain in a scenario where a UE receives a call.

A method for voice call fallback to a CS domain in a scenario where a UE receives a call is described in the following. As shown in FIG. 2, the method includes the following steps.

S201*a*. An MSC sends a Paging Request message to an MME, and the MME starts to page the UE.

S201*b*. A called UE sends an Extended Service Request message.

S201*c*. If the called UE rejects the call, the MME sends a CS Paging Reject message to the MSC, and the procedure is ended.

S201*d*. The MME sends a message indicating the call is a CSFB call to an eNB.

Then the subsequent steps are executed. Steps S202 to S207 are the same as steps S102 to S107 in the scenario where the UE initiates a call.

Figure 3:
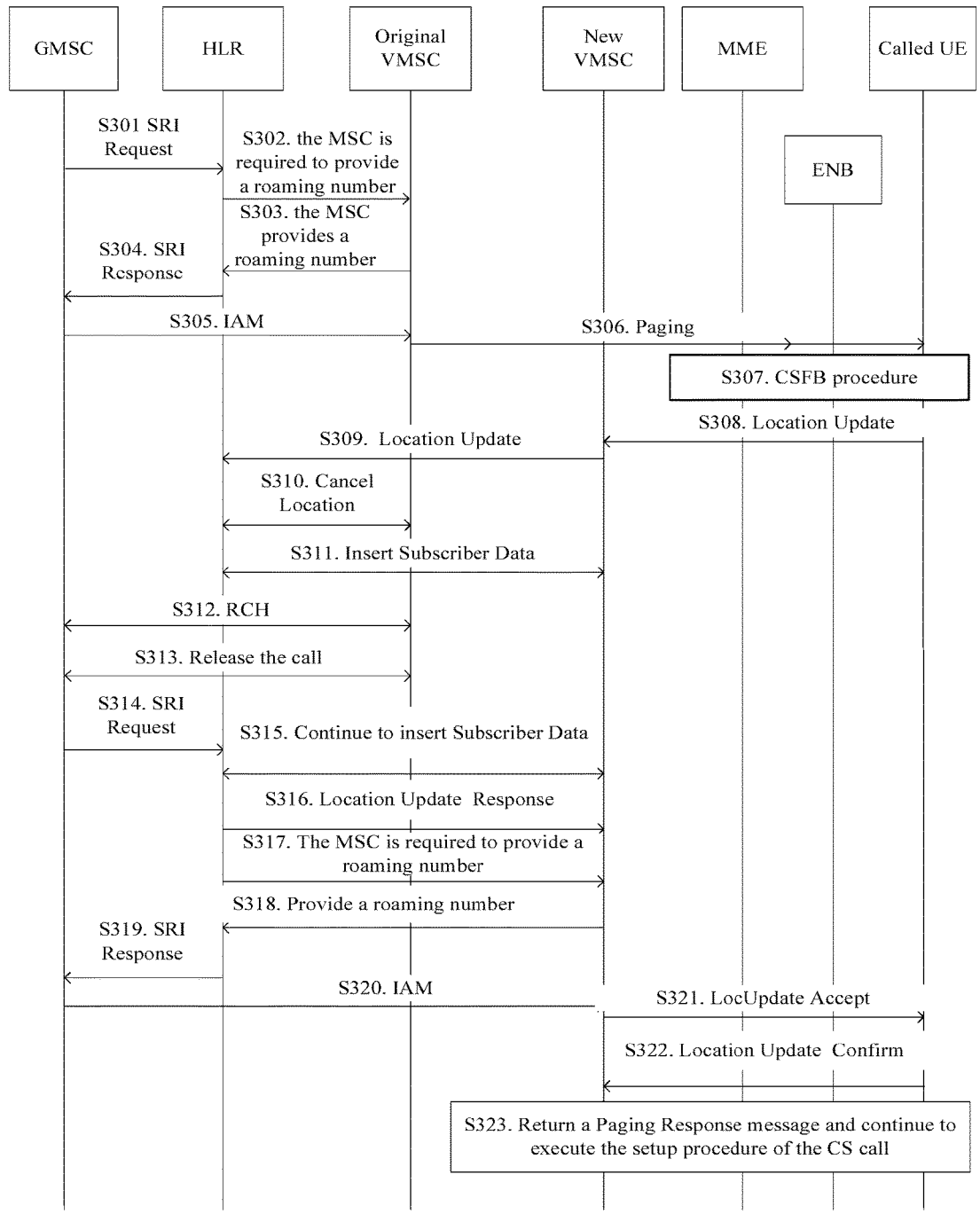
FIG. 3 is a flowchart showing a roaming retry process of voice call fallback to a CS domain in a scenario where a UE receives a call.

If the MSC is changed in step S205, a roaming retry procedure is triggered. As shown in FIG. 3, the procedure includes the following steps.

S301. A gateway mobile switching center (GMSC) sends a Send Routing Information (SRI) Request message to an HLR.

S302. The HLR sends a Provide Roaming Number (PRN) Request message to a called MSC.

S303. The called MSC returns a Response message to provide a roaming number.

S304. The HLR returns an SRI Request ACK message.
S305. The GMSC sends an IAM to the called MSC.
S306. The MSC starts to page a called UE.
S307. A CSFB called procedure is executed.

The called UE sends a Service Request message to the MME; the MME instructs the ENB that the call is a CSFB call; optionally, the eNB may require the called UE to execute measurement; the eNB initiates PS handover; the called UE is handed over to a 2G/3G network; the called UE sends a Paging Response message to the MSC accessed by the UE; if the MSC has changed, the MSC accessed by the UE sends a Reject message to the called UE, where the MSC accessed by the UE may be referred to as a new MSC.

S308. The called UE sends a Location Update message to the new MSC.

S309. The new MSC sends a Location Update message to the HLR.

S310. The HLR sends a Location Cancel message to the original MSC.

The original MSC stops paging and returns a Location Cancel ACK message to the HLR.

S311. The HLR insert subscriber data to the new MSC.

S312. The original MSC initiates a Resume Call Handling (RCH) notification.

S313. The GMSC releases the call of the original MSC.

S314. The GMSC reinitiates an SRI Request message.

S315. The HLR continues to complete insertion of subscriber data.

S316. The HLR returns a Location Update message to the new MSC.

S317. The HLR sends a PRN Request message to the new MSC, requiring the new MSC to provide a roaming number.

S318. The new MSC provides a roaming number.

S319. The HLR returns an SRI Request ACK message to the GMSC.

S320. The GMSC sends an IAM to the new MSC.

S321. The new MSC returns a Location Update Accept message to the UE, where the Location Update Accept message includes a new allocated temporary mobile station identity (TMSI).

S322. The UE returns a TMSI Allocation Confirm message to the new MSC.

S323. The UE returns a Paging Response message and continues to execute the setup procedure of the CS call between the network and the UE.

In the research and practice of the preceding CSFB technical solution, the inventor of the present invention finds the following problems:

In a CSFB call, the required time from a caller dialing a number to hearing an RBT consists of the following time segments: random access time in an LTE network (corresponding to step S101a, if a UE is in an idle state, the UE needs to perform random access before sending a Service Request message to an MME), time for measuring a 2G/3G network (optionally, corresponding to step S102), PS handover time (corresponding to step S103), time for reading information about a CS domain system (corresponding to step S104, where the information about the CS domain system needs to be read for access to the CS domain), location update time (corresponding to step S105 in the scenario where a calling MSC has changed), processing time of a CS core network (corresponding to step S106), and called connection time (as described in the preceding).

If the called party is a CSFB user, the called connection time consists of the following time segments: paging time in an LTE network (corresponding to step S201a if a UE is in an idle state), random access time in the LTE network (corresponding to step S201b if the UE is in the idle state), time for measuring a 2G/3G network (optionally, corresponding to step S202), PS handover time (corresponding to step S203), time for reading information about a CS domain system (corresponding to step S204, where the information about the CS domain system needs to be read for access to the CS domain), roaming retry time of an MSC (corresponding to steps S301 to S323 in the scenario where a called MSC has changed), and processing time of a CS core network (corresponding to step S206).

It can be seen that, the procedure for voice call fallback to the CS domain is processed in series, and both the calling connection time and the called connection time consist of multiple time segments. Therefore, the connection time is long, affecting the user experience.

The technical solution of the present invention is hereinafter described in detail with reference to the accompanying drawings. Obviously, the described embodiments are only exemplary embodiments of the present invention and the present invention is not limited to such embodiments. Other embodiments that those skilled in the art derive from embodiments of the present invention without any creative effort also fall in the protection scope of the present invention.

Embodiment 1

Figure 4:
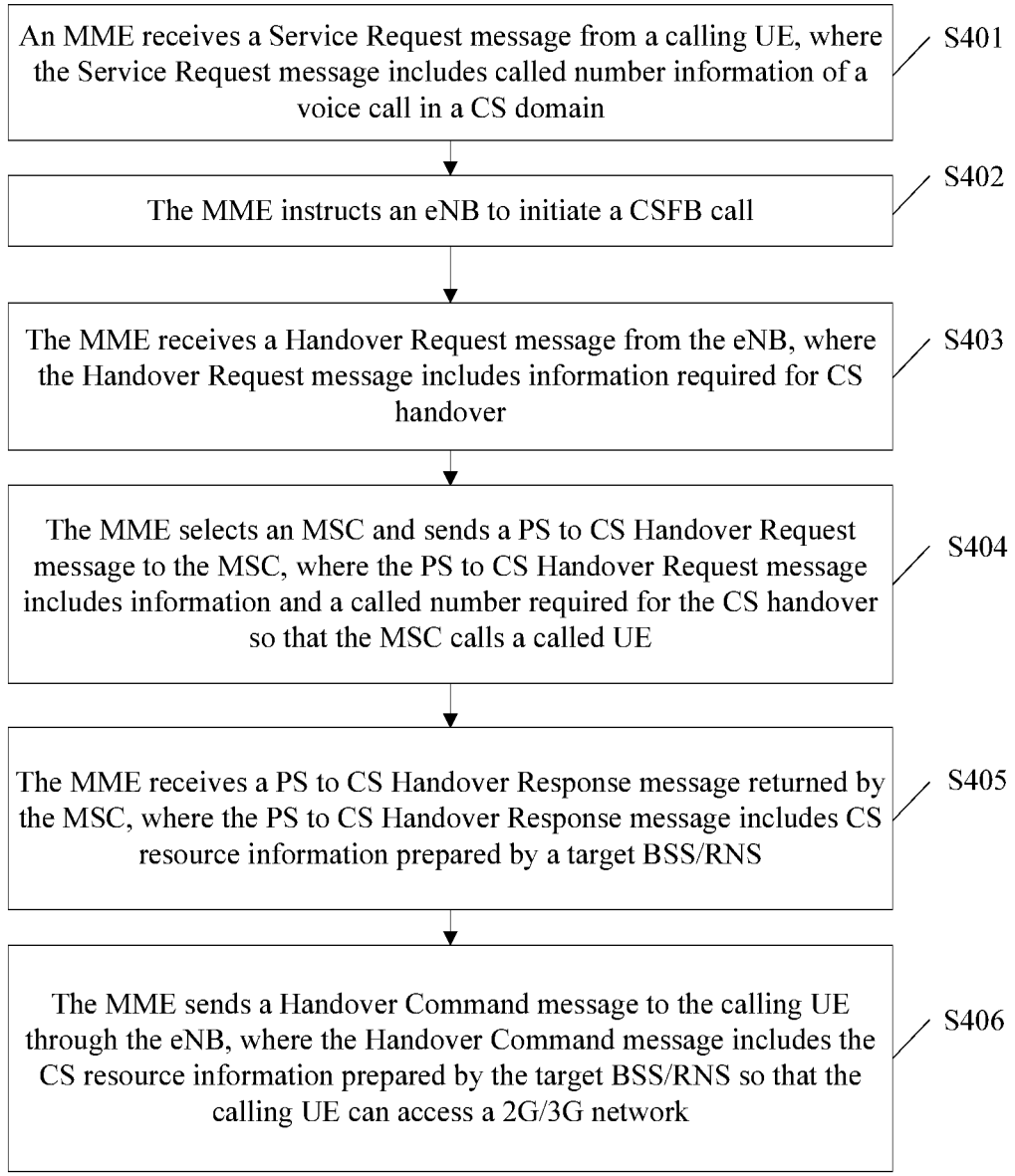
FIG. 4 is a flowchart showing a method for voice call fallback to a CS domain according to a first embodiment of the present invention.

As shown in FIG. 4, the processing procedure of an MME in a scenario where a UE is on the caller side and the caller initiates a call is described. The specific steps are as follows:

S401. An MME receives a Service Request message from a calling UE, where the Service Request message includes called number information of a voice call in a CS domain.

For example, the Service Request message sent by the UE to the MME may include a called number field that is used to bear called number information.

S402. The MME instructs an eNB to initiate CSFB handover.

S403. The MME receives a Handover Request message from the eNB, where the Handover Request message includes information required for CS handover.

In practice, the information required for the CS handover includes a target identity (ID). The target ID may be a radio network controller (RNC) ID or a cell ID. It is understandable that the meaning of the target ID is also applicable to other embodiments of the present invention.

S404. The MME selects an MSC and sends a PS to CS Handover Request message to the MSC, where the PS to CS Handover Request message includes information required for the CS handover and a called number so that the MSC calls a called UE.

In practice, if the MME has obtained a calling number from a home subscriber server (HSS), the MME may insert the calling number into the message, or the calling number may be provided by the UE in step S401.

The MME may select the MSC that is selected in an attach procedure, and this may cause inter-MSC handover; or the MME may select a corresponding MSC according to the target ID, and this does not cause inter-MSC handover, but the selected MSC must send a Location Update message to the HSS.

S405. The MME receives a PS to CS Handover Response message returned by the MSC, where the PS to CS Handover Response message includes CS resource information prepared by a target BSS/RNS.

S406. The MME sends a Handover Command message to the calling UE through the eNB. The Handover Command message includes the CS resource information prepared by the target BSS/RNS so that the calling UE can access a 2G/3G network.

It can be seen that, when receiving a Service Request message from the calling UE, the MME directly instructs the eNB to initiate CSFB handover according to the called number information of the voice call in a CS domain in the Service Request message; after receiving a Handover Request message from the eNB, the MME selects an MSC and sends a PS to CS Handover Request message to the MSC, where the PS to CS Handover Request message includes information and a called number required for CS handover so that the MSC calls the called UE; when receiving a PS to CS Handover Response message returned by the MSC, the MME provides CS resource information prepared by a target BSS/RNS and included in the PS to CS Handover Response message for the calling UE by sending a Handover Command message to the calling UE through the eNB, so that the calling UE can access a 2G/3G network. In this process, an access process of the UE is completed by CS handover, and the CS handover process and the processing of the CS core network are executed in parallel. Therefore, the whole process of a voice call fallback to a CS domain consists of the following time segments: random access time in an LTE network (corresponding to step S401), MAX (CS handover time, corresponding to steps S402 to S406), and processing time of a CS core network (corresponding to step S404), where MAX represents the maximum value between the CS handover time and the processing time of the CS core network. Therefore, the method for voice call fallback to a CS domain provided in this embodiment may reduce the delay and improve the user experience.

To better implement the technical solution of the present invention, an Sv interface may be added between an MME and an MSC in the network, so that the MME can directly send a PS to CS Handover Request message to the MSC, where the PS to CS Handover Request message includes information required for CS handover so that the CS handover procedure and the processing procedure of the CS core network can be executed simultaneously. In this way, the delay is reduced.

Figure 5:
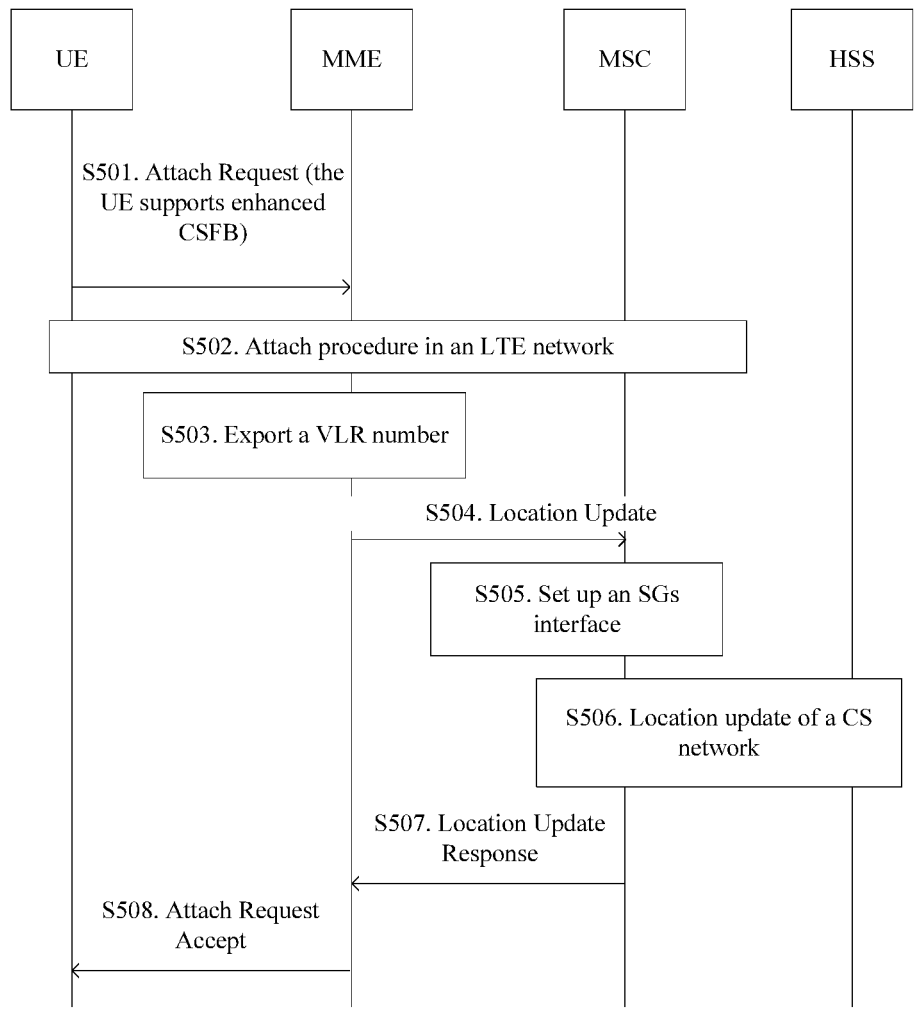
FIG. 5 is a flowchart showing an attach procedure of a UE according to the first embodiment of the present invention.

In a specific execution, the MME may add information to the message sent to an eNB so as to instruct the eNB to initiate CSFB handover, where the information indicates that the call is an enhanced CSFB call. However, all devices of the network may support enhanced CSFB in this embodiment, or only some devices support enhanced CSFB. If only some devices support enhanced CSFB, the MME needs to determine devices that support enhanced CSFB. The MME may obtain and determine devices that support enhanced CSFB in many ways. For example, the MME may determine whether a UE supports enhanced CSFB in an attach process. As shown in FIG. 5, the specific steps are as follows:

S501. A UE sends an Attach Request message to an MME, where the Attach Request message includes information indicating whether the UE supports enhanced CSFB.

The MME receives the Attach Request message, and makes a judgment according to the information indicating whether enhanced CSFB is supported included in the message.

S502. The UE is attached to an LTE network.

S503. The MME exports a visitor location register (VLR) number.

The VLR number may usually be preconfigured on the MME.

S504. The MME sends a Location Update message to an MSC/VLR on behalf of the UE.

S505. The MSC sets up an SGs interface.

S506. The MSC completes a location update procedure of a CS domain.

S507. The MSC returns a Location Update Response message to the MME.

S508. The MME sends an Attach Request Accept message to the UE.

It is understandable that the UE may also add information to other messages (for example, a Location Update message) sent to the MME, where the information indicates whether the UE supports enhanced CSFB. Optionally, the MME may also determine whether the UE supports enhanced CSFB in other ways. For example, all UEs supporting CSFB support enhanced CSFB by default, or the UE carries other preset parameters (for example, a called number) in an Extended Service Request message to determine that the UE supports enhanced CSFB.

In the setup process of an S1 interface, the MME may determine whether an eNB supports enhanced CSFB according to the information indicating whether enhanced CSFB is supported carried in an S1 Setup Request message received from the eNB, or determine whether an eNB supports enhanced CSFB by other means. For example, the MME may obtain information about whether an eNB supports CSFB through background configuration.

Embodiment 2

Figure 6:
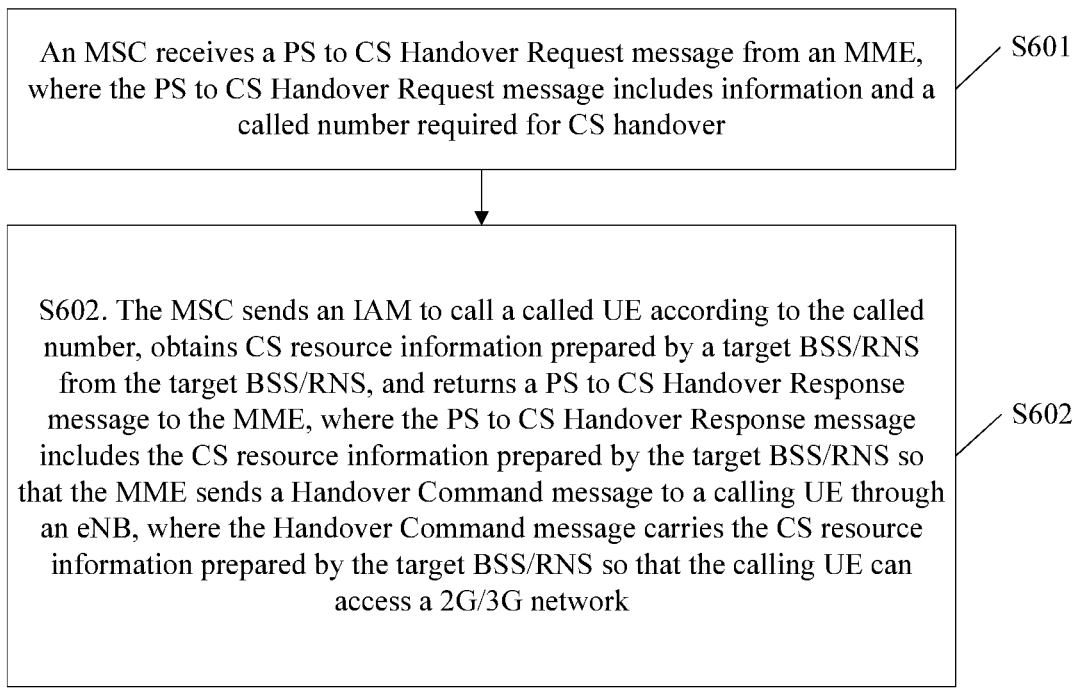
FIG. 6 is a flowchart showing a method for voice call fallback to a CS domain according to a second embodiment of the present invention.

As shown in FIG. 6, the processing procedure of an MSC in a scenario where a UE is on the caller side and the caller initiates a call is described. The specific steps are as follows:

S601. An MSC receives a PS to CS Handover Request message from an MME, where the PS to CS Handover Request message includes information required for CS handover and a called number, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB.

S602. The MSC sends an IAM to call a called UE according to the called number, obtains CS resource information prepared by a target BSS/RNS from the target BSS/RNS, and returns a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the calling UE can access a 2G/3G network.

The calling UE may consider that the called UE has already been in an off-hook state after the calling UE accesses the 2G/3G network or after the set timer expires. The calling UE may also know that the called UE has already been in an off-hook state when receiving a message returned by the network, where the message notifies that the called UE goes off-hook and starts a conversation. The specific steps are as follows:

After receiving an ACM returned by the called UE and a Handover Complete message sent by the calling UE, the MSC notifies the calling UE of the alerting; then after receiving an Answer Message (ANM) from the called UE, the MSC sends a Notification message to the calling UE to notify the calling UE that the called UE goes off-hook and starts a conversation.

The MSC may receive an ACM returned by a called MSC or a GMSC. The called MSC or the GMSC may return an ANM to the MSC.

In this embodiment, because the PS to CS Handover message received by the MSC from the MME includes information and a called number required for CS handover, the MSC may execute the following two processes in parallel: sending an IAM to the called UE, and returning the CS resource information prepared by the target BSS/RNS and obtained from the target BSS/RNS to the MME through a PS to CS Handover Response message, namely, executing the processing of the CS core network and the CS handover process in parallel. In this way, the delay may be reduced and the user experience may be improved.

The following describes a method for voice call fallback to a CS domain in a process where a UE serves as a caller to initiate a call according to an embodiment of the present invention through two application scenarios.

Embodiment 3

Figure 7:
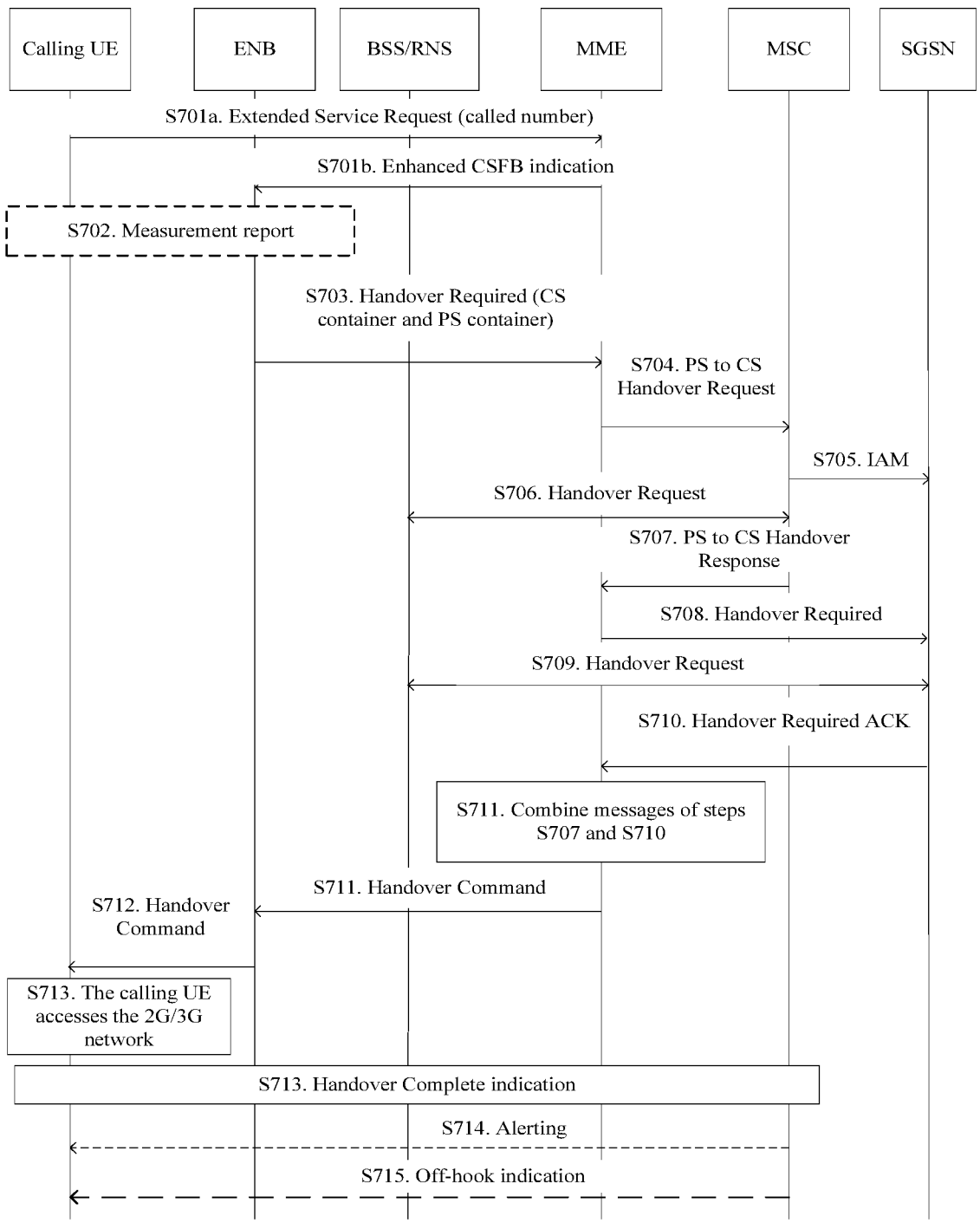
FIG. 7 is a flowchart showing a method for voice call fallback to a CS domain according to a third embodiment of the present invention.

In this embodiment, a UE is a calling UE, and a 2G/3G network supports PS handover. The following describes the procedure for voice call fallback to a CS domain in a process where the UE initiates a call. As shown in FIG. 7, the specific steps are as follows:

S701a. A user wants to initiate a CS voice call. A calling UE is attached to an LTE network and is in an idle or active state. The calling UE sends an Extended Service Request message to an MME, where the Extended Service Request message includes called number information of a voice call in a CS domain.

S701b. The MME instructs an eNB that the call is an enhanced CSFB call.

The MME needs to confirm whether to initiate an enhanced CSFB procedure. The MME first judges whether the calling UE wants to initiate a CS voice call. The Extended Service Request message may carry type information of a service to be initiated. The specific service type may be voice call, SMS, or supplementary service. The MME also needs to judge whether an enhanced CSFB call can be initiated mainly according to whether the UE and the eNB support enhanced CSFB. If the call is a CS voice call and carries a called number, and both the calling UE and the eNB support enhanced CSFB, the MME instructs the eNB that the call is an enhanced CSFB call.

S702. Optionally, the eNB triggers measurement.

The eNB may send a message instructing the calling UE to measure the signal quality of a 2G/3G network. The calling UE reports a measurement result. If the eNB confirms that the reported signal quality of the 2G/3G network satisfies the preset signal quality requirement, step S703 is executed.

S703. The eNB sends a Handover Request message to the MME, and carries information required for PS handover and information required for CS handover in the Handover Request message according to the information indicating the call is an enhanced CSFB call in step S601b.

The eNB may construct a PS transparent container and a CS transparent container respectively, and the two containers are used to bear information required for PS handover and information required for CS handover respectively. The information required for PS handover encapsulated in the PS transparent container and the information required for CS handover encapsulated in the CS transparent container comply with the existing 2G/3G network specifications and are the target ID of the PS handover and the target ID of the CS handover respectively. The eNB may ensure they are the same.

S704. The MME selects an MSC, and sends a PS to CS Handover Request message to the MSC, where the PS to CS Handover Request message includes a calling number, a called number, and information required for CS handover.

As described in step S703, the information required for CS handover may be encapsulated in the CS transparent container.

The calling number may be transmitted by the calling UE to the MME in step S701a. If the calling UE does not transmit the calling number, the MME may determine the calling number according to the UE number stored by the MME itself, because the MME can obtain the number of the calling UE from an HSS.

The MSC selected by the MME is an upgraded MSC that can support enhanced CSFB. If only some MSCs in the network are upgraded, the MME must select an MSC that can support enhanced CSFB. Therefore, the MME cannot ensure that the selected MSC is consistent with the MSC corresponding to the location area (LA) of a target cell. Inconsistent MSCs cause inter-MSC handover, which is described in the following procedure.

If all MSCs in the network are upgraded to support enhanced CSFB, the MME can select the corresponding MSC according to the LA of a target cell. Under this circumstance, inter-MSC handover does not occur. The MME sends a PS to CS Handover Request message to the MSC, where the PS to CS Handover Request message carries a calling number, a called number, and a CS transparent container that bears information required for CS handover. No matter whether the MSC has registration information of the calling UE, the MSC performs a CSFB call for the calling UE.

S705. The MSC calls the called number, and sends an IAM or an INVITE message if the call needs to be outgoing.

If the call is an inter-MSC call, a Session Initiation Protocol with Encapsulated ISUP (SIP-I) message or an Integrated Services Digital Network User Part (ISUP) message may be used.

S706. If the MSC determines that the target MSC is not itself (according to the target ID), the MSC performs inter-MSC handover, and the target MSC commands a target BSS/RNS to prepare CS resources. If the MSC determines that the target MSC is itself, the MSC sends a Handover Request message to the target BSS/RNS, and the target BSS/RNS prepares CS resources.

It is understandable that there is no strict time sequence between step S705 and step S706.

S707. After inter-MSC handover is completed, the target MSC returns a PS to CS Handover Complete message to the MME, where the PS to CS Handover Complete message includes the CS resource information prepared by the target BSS/RNS.

In practice, CS resource information prepared by a target BSS/RNS may include a dedicated air interface channel of a CS voice service and system information, which may be encapsulated in a CS transparent container and comply with the CS domain specifications in the existing 2G/3G network.

S708. The MME sends a Handover Request message to a serving GPRS (acronym of general packet radio service) support node (SGSN), where the Handover Request message includes information required for PS handover.

As described in the preceding, in practice, a PS transparent container may be used to bear the information required for PS handover, for example, the target ID required for PS handover.

Step S708 and step S704 may proceed simultaneously.

S709. The SGSN sends a Handover Request message to the target BSS/RNS, and the target BSS/RNS returns the prepared PS resource information.

S710. The SGSN returns a Handover Request ACK message to the MME, where the Handover Request ACK message includes the PS resource information prepared by the target BSS/RNS.

In practice, PS resource information prepared by a target BSS/RNS may include an air interface channel of the PS service and system information, which may be encapsulated in a PS transparent container and comply with the CS specifications in the existing 2G/3G network.

S711. After the messages in steps S707 and S710 are received, the MME combines the two messages and combines the PS resource information and the CS resource information, and sends a Handover Command message to the eNB, where the Handover Command message includes the combined resource information.

In practice, the PS to CS Handover Complete message includes the CS resource information prepared by the target BSS/RNS (mainly including the dedicated air interface channel of the CS voice service and the system information, which are encapsulated in the CS transparent container and comply with the CS domain specifications in the existing 2G/3G network), and the Handover Request ACK message includes PS resource information (mainly including the air interface channel of the PS service and the system information, which are encapsulated in the PS transparent container and comply with the CS specifications in the existing 2G/3G network). The CS transparent container is combined with the PS transparent container to form a combined transparent container, and the combined transparent container is used to bear the resource prepared by the target BSS/RNS.

S712. The eNB sends a Handover Command message to the calling UE, where the Handover Command message includes the resource information prepared by the target BSS/RNS.

S713. The calling UE accesses the 2G/3G network, and sends a Handover Complete message to the target BSS/RNS; the target BSS/RNS sends the Handover Complete message to the target MSC; and the target MSC sends the Handover Complete message to the original MSC.

S714. After receiving an ACM, the original MSC sends the ACM to the target MSC; the target MSC sends a called Alerting message to the calling UE; the user begins to hear an RBT.

Alternatively, the original MSC does not send an ACM to the target MSC, and the target MSC does not send an Alerting message to the calling UE. The call state of the calling UE is processed by the calling UE itself. The calling UE may consider that the called UE already connects the call and goes off-hook after handover is completed (or after a set timer expires). In this way, the hearing the RBT and the conversation are not affected for the user.

If no inter-MSC handover occurs, the MSC directly sends an Alerting message to the calling UE.

S715. After receiving an ANM, the original MSC sends the ANM to the target MSC, and the target MSC sends a Connect message to the UE. Then the calling UE and the called UE start a conversation.

Alternatively, the original MSC does not send an ANM to the target MSC, and the target MSC does not send a Connect message to the calling UE. The call state of the calling UE is processed by the calling UE itself. The calling UE may consider that the called UE already connects the call and goes off-hook after handover is completed (or after a set timer expires), the hearing the RBT and the conversation are not affected for the caller.

If no inter-MSC handover occurs, the MSC directly sends a Connect message to the calling UE.

It can be seen that, in this embodiment, the calling connection time mainly consists of the following time segments: random access time in an LTE network (corresponding to step S701a if a UE is in an idle state), time for measuring a 2G/3G network (optionally, corresponding to step S702), MAX (PS handover time, corresponding to steps S708 to S710), CS handover time (corresponding to steps S704, and S706 to S707), processing time of a CS core network (corresponding to step S705), and the called connection time (corresponding to steps S714 to S715). In comparison with the caller connection time in the CSFB technical solution illustrated in FIG. 1, the main difference is that: In this embodiment, MAX replaces the PS handover time, time for reading information about the CS domain system, location update time (corresponding to the scenario where the calling MSC has changed), and processing time of the CS core network in the solution of FIG. 1; in this embodiment, CS handover, PS handover, and processing of the CS core network are parallel rather than serial in the solution of FIG. 1. Therefore, the MAX duration depends on only the longest time of these three processes. Compared with the method for voice call fallback to a CS domain in the scenario where a UE serves as a caller to initiate a call in the solution of FIG. 1, the method in this embodiment may reduce the delay and improve the user experience.

Embodiment 4

Figure 8:
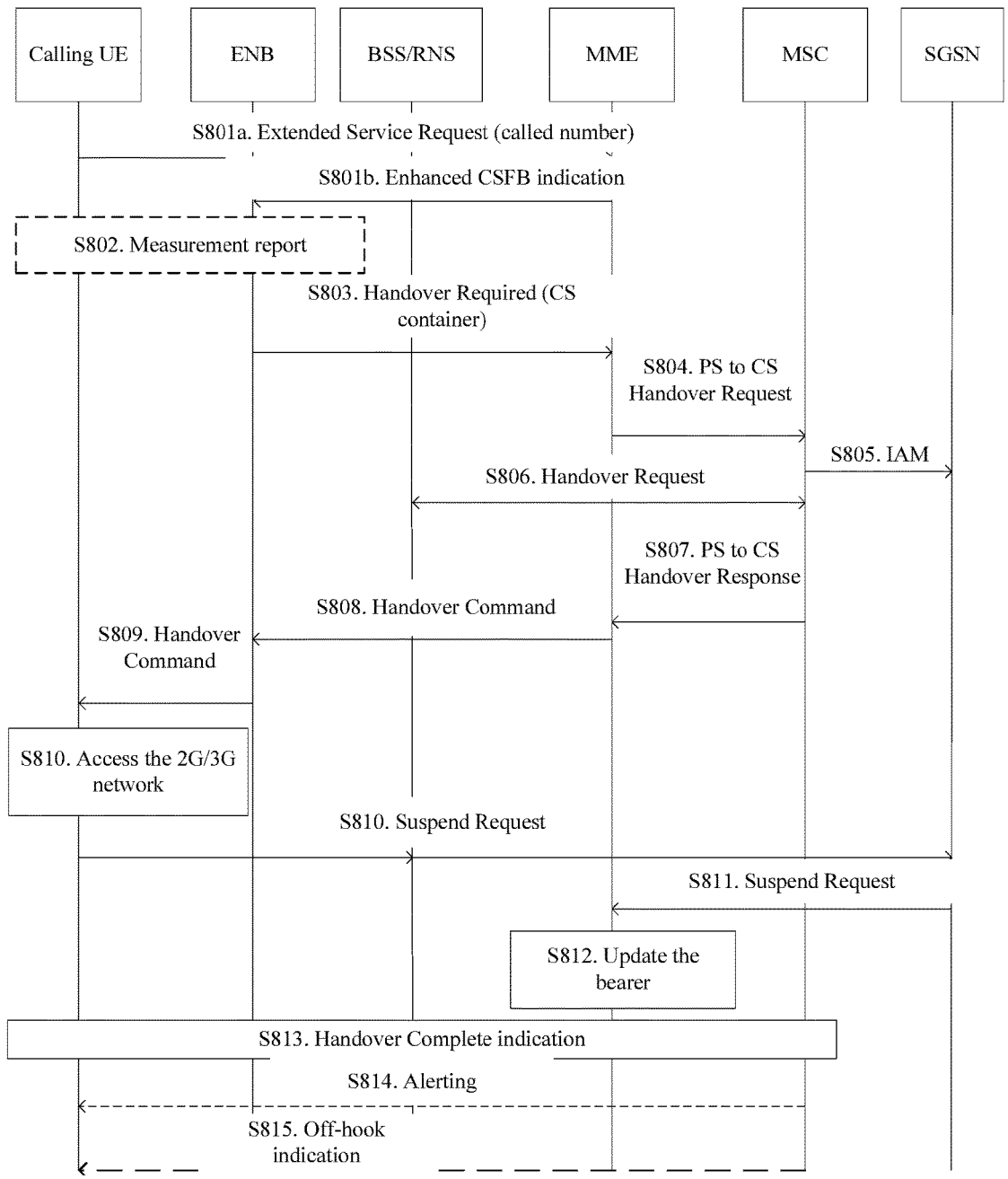
FIG. 8 is a flowchart showing a method for voice call fallback to a CS domain according to a fourth embodiment of the present invention.

In this embodiment, a UE is a calling UE, and a 2G/3G network does not support PS handover; after accessing the 2G/3G network, the UE sends a PS Service Suspend message to an SGSN; the SGSN notifies an MME; the MME instructs an SGW to update the bearer. The suspension procedure is an existing procedure. As shown in FIG. 8, the specific steps are as follows:

Steps S801a to S801b are the same as steps S701a to S701b.

Step S802 is the same as step S702.

S803. The eNB sends a Handover Request message to the MME, and carries information required for CS handover in the Handover Request message according to the information indicating the call is an enhanced CSFB call in step S801b.

The eNB constructs a CS transparent container used to bear the information required for CS handover. The information required for CS handover encapsulated in the CS transparent container complies with the existing 2G/3G network and includes a target ID.

S804. The MME selects an MSC, and sends a PS to CS Handover Request message to the MSC, where the PS to CS Handover Request message includes a calling number, a called number, and information required for CS handover.

As described in step S803, the information required for CS handover may be encapsulated in the CS transparent container.

The calling number may be transmitted by the calling UE to the MME in step S801a. If the calling UE does not transmit the calling number, the MME may determine the calling number according to the UE number stored by the MME itself, because the MME can obtain the number of the calling UE from an HSS.

The MSC selected by the MME is an upgraded MSC that can support enhanced CSFB. If only some MSCs in the network are upgraded, the MME must select an MSC that can support enhanced CSFB. Therefore, the MME cannot ensure that the selected MSC is consistent with the MSC corresponding to the LA of a target cell. Inconsistent MSCs cause inter-MSC handover, which is described in the following procedure.

If all MSCs in the network are upgraded to support enhanced CSFB, the MME can select the corresponding MSC according to the LA of a target cell. Under this circumstance, inter-MSC handover does not occur. The MME sends a PS to CS Handover Request message to the MSC, where the PS to CS Handover Request message carries a calling number, a called number, and a CS transparent container that bears information required for CS handover. No matter whether the MSC has registration information of the calling UE, the MSC performs a CSFB call for the calling UE.

S805. The MSC calls the called number, and sends an IAM or an INVITE message if the call needs to be outgoing.

If the call is an inter-MSC call, an SIP-I message or an ISUP message may be used.

S806. If the MSC determines that the target MSC is not itself (according to the target ID), the MSC performs inter-MSC handover, and the target MSC commands a target BSS/RNS to prepare CS resources. If the MSC determines that the target MSC is itself, the MSC sends a Handover Request message to the target BSS/RNS, and the target BSS/RNS prepares CS resources.

It is understandable that there is no strict time sequence between step S805 and step S806.

S807. After handover is completed, the MSC returns a PS to CS Handover Complete message to the MME, where the PS to CS Handover Complete message includes the CS resource information prepared by the target BSS/RNS.

In practice, CS resource information prepared by a target BSS/RNS may include a dedicated air interface channel of a CS voice service and system information, which may be encapsulated in a CS transparent container and comply with the CS domain specifications in the existing 2G/3G network.

S808. The MME sends a Handover Command message to the eNB, where the Handover Command message includes the CS resource information prepared by the target BSS/RNS.

In practice, the PS to CS Handover Complete message includes CS resource information prepared by a target BSS/RNS (mainly including a dedicated air interface channel of a CS voice service and system information, which are encapsulated in a CS transparent container and comply with the CS domain specifications in the existing 2G/3G network).

S809. The eNB sends a Handover Command message to the calling UE, where the Handover Command message includes the CS resource information prepared by the target BSS/RNS.

S810. The calling UE accesses the 2G/3G network, and sends a Service Suspend Request message to an SGSN through the target BSS/RNS.

S811. The SGSN sends the Service Suspend Request message to the MME.

S812. The MME instructs an SGW to update the bearer.

S813. The calling UE sends a Handover Complete message to the target BSS/RNS; the target BSS/RNS sends the Handover Complete message to the target MSC; and the target MSC sends the Handover Complete message to the original MSC.

S814. After receiving an ACM, the original MSC sends the ACM to the target MSC; the target MSC sends a called Alerting message to the calling UE; the user begins to hear an RBT.

Alternatively, the original MSC does not send an ACM to the target MSC, and the target MSC does not send an Alerting message to the calling UE. The call state of the calling UE is processed by the calling UE itself. The calling UE may consider that the called UE already connects the call and goes off-hook after handover is completed (or after a set timer expires), the hearing the RBT and the conversation are not affected for the user.

If no inter-MSC handover occurs, the MSC directly sends an Alerting message to the calling UE.

S815. After receiving an ANM, the original MSC sends the ANM to the target MSC, and the target MSC sends a Connect message to the UE. Then the calling UE and the called UE start a conversation.

It can be seen that, in this embodiment, the calling connection time mainly consists of the following time segments: random access time in an LTE network (corresponding to step S801a if a UE is in an idle state), time for measuring a 2G/3G network (optionally, corresponding to step S802), MAX (CS handover time, corresponding to steps S804, and S806 to S807), processing time of a CS core network (corresponding to step S805), service suspension time (corresponding to steps S810 to S812), and the called connection time (corresponding to steps S814 to S815). In comparison with the calling connection time in the CSFB technical solution illustrated in FIG. 1, the main difference is that: In this embodiment, MAX replaces the PS handover time, time for reading information about the CS domain system, location update time (corresponding to the scenario where the calling MSC has changed), and processing time of the CS core network in the CSFB technical solution illustrated in FIG. 1; in this embodiment, CS handover and processing of the CS core network are parallel rather than serial in the solution of FIG. 1. Therefore, the MAX duration depends on only the longer time of these two processes. Compared with the method for voice call fallback to a CS domain in the scenario where a UE serves as a caller to initiate a call in the solution of FIG. 1, the method in this embodiment may reduce the delay and improve the user experience.

Embodiment 5

Figure 9:
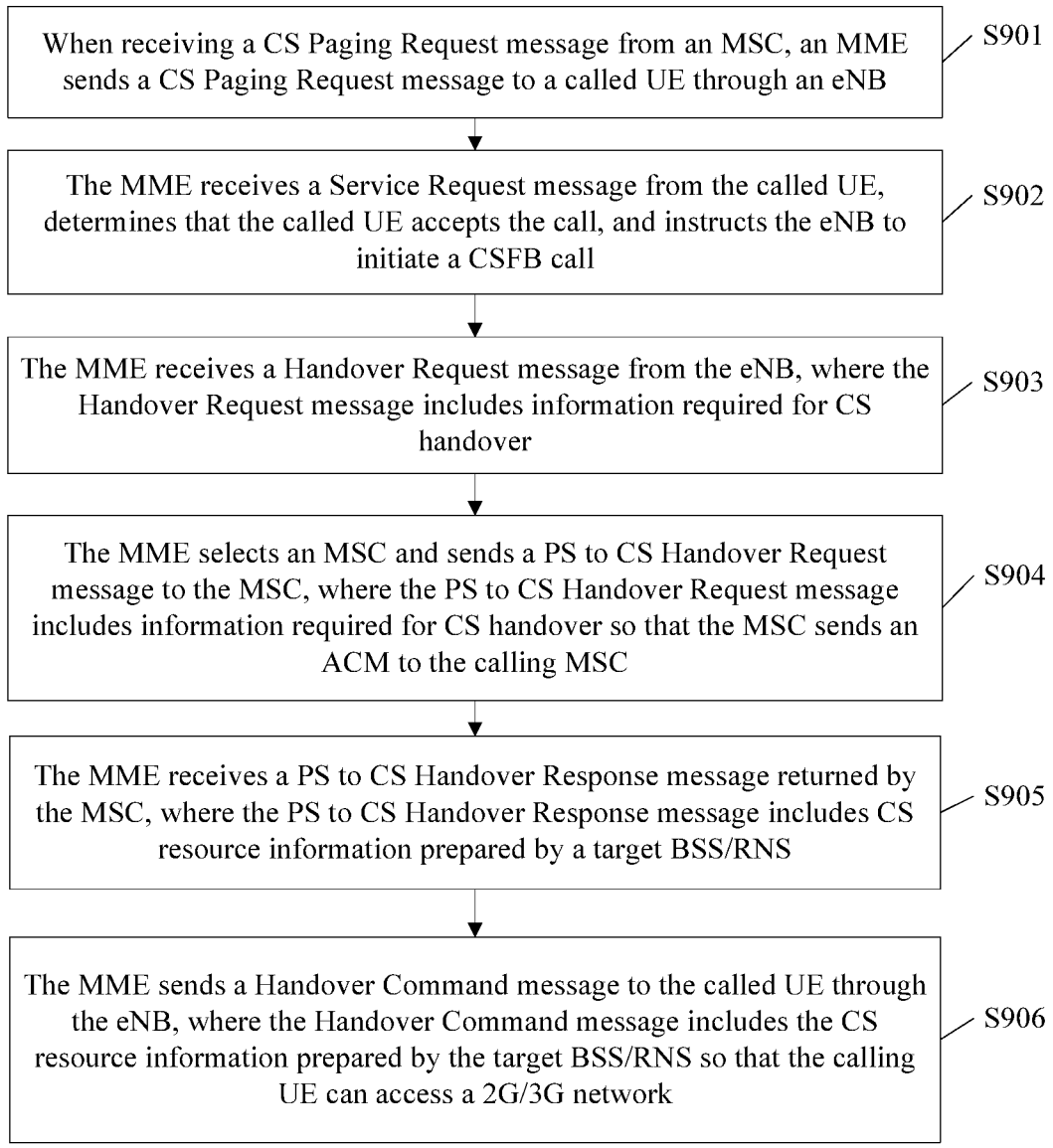
FIG. 9 is a flowchart showing a method for voice call fallback to a CS domain according to a fifth embodiment of the present invention.

In this embodiment, a UE is a called UE. The following describes a processing procedure of an MME in a scenario where the called UE receives paging. As shown in FIG. 9, the specific steps are as follows:

S901. When receiving a CS Paging Request message from an MSC, an MME sends a CS Paging Request message to a called UE through an eNB.

S902. The MME receives a Service Request message from the called UE, determines that the called UE accepts the call, and instructs the eNB to initiate CSFB handover.

S903. The MME receives a Handover Request message from the eNB, where the Handover Request message includes information required for CS handover.

In practice, the information required for CS handover may include a target ID.

S904. The MME selects an MSC and sends a PS to CS Handover Request message to the MSC, where the PS to CS Handover Request message includes information required for CS handover, and the MSC sends an ACM to the calling MSC.

S905. The MME receives a PS to CS Handover Response message returned by the MSC, where the PS to CS Handover Response message carries CS resource information prepared by a target BSS/RNS.

S906. The MME sends a Handover Command message to the called UE through the eNB, where the Handover Command message includes the CS resource information prepared by the target BSS/RNS so that the calling UE can access a 2G/3G network.

It can be seen that, with respect to the called UE, when receiving a CS Paging Request message from the MSC, the MME sends a CS Paging Request message to the called UE through the eNB; when receiving a Service Request message from the called UE, the MME determines that the called UE accepts the call, and instructs the eNB to initiate CSFB handover; when receiving a Handover Request message from the eNB, the MME selects an MSC and sends a PS to CS Handover Request message to the MSC, where the PS to CS Handover Request message includes information required for CS handover so that the MSC sends an ACM to the calling MSC. When receiving a PS to CS Handover Response message returned by the MSC, the MME provides the CS resource information prepared by the target BSS/RNS and included in the PS to CS Handover Response message for the called UE by sending a Handover Command message to the called UE through the eNB so that the called UE accesses the 2G/3G network. In this process, the CS handover process and the processing of the CS core network are executed in parallel. In this way, the delay may be reduced and the user experience may be improved.

To better implement the technical solution of the present invention, an Sv interface may be added between the MME and the MSC in the network, so that the MME can directly send a PS to CS Handover Request message to the MSC, where the PS to CS Handover Request message includes information required for CS handover so that the CS handover procedure and the processing procedure of the CS core network can be executed simultaneously. In this way, the delay is reduced.

In a specific execution, the MME may add information to the message sent to the eNB so as to instruct the eNB to initiate CSFB handover, where the information indicates that the call is an enhanced CSFB call. However, all devices of the network may support enhanced CSFB in this embodiment, or only some devices support enhanced CSFB. If only some devices support enhanced CSFB, the MME needs to determine devices that support enhanced CSFB. The MME may obtain and determine devices that support enhanced CSFB in many ways. For details, see the attach procedure described in the first embodiment and FIG. 5, and there is no further description here.

Embodiment 6

Figure 10:
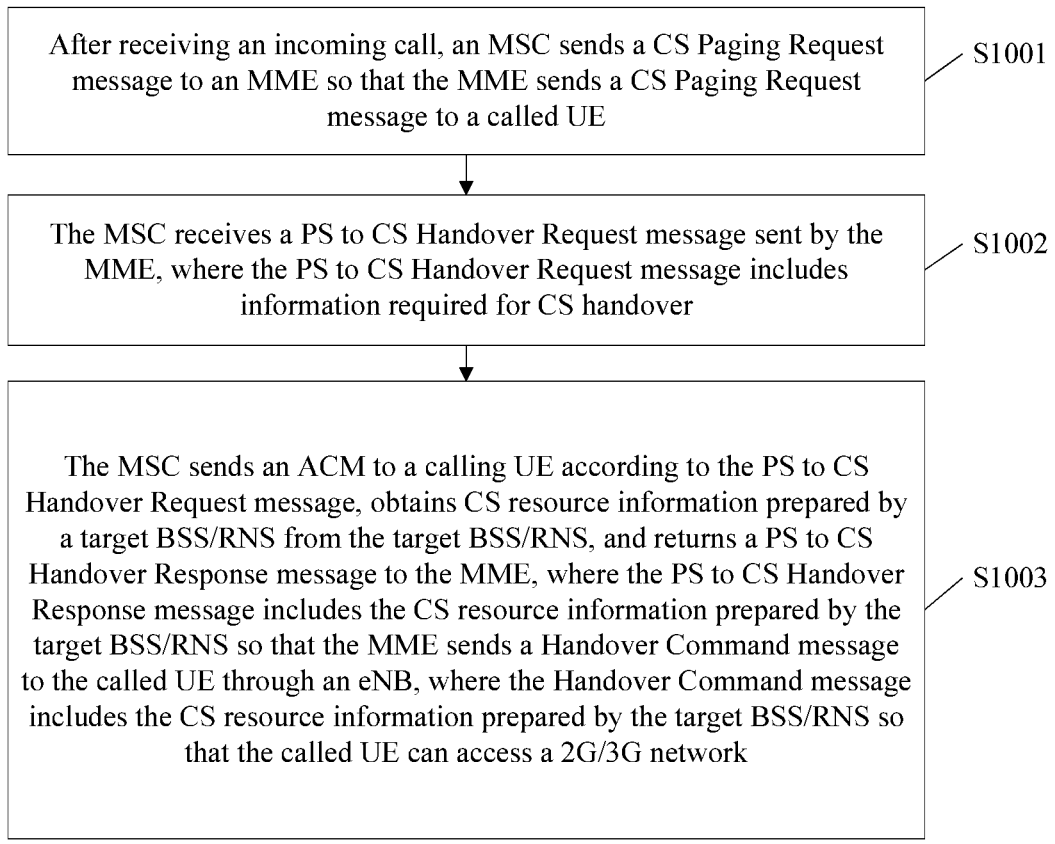
FIG. 10 is a flowchart showing a method for voice call fallback to a CS domain according to a sixth embodiment of the present invention.

In this embodiment, a UE is a called UE. The following describes a processing procedure of an MSC in a scenario where the called UE receives paging. As shown in FIG. 10, the specific steps are as follows:

S1001. After receiving an incoming call, an MSC sends a CS Paging Request message to an MME so that the MME sends a CS Paging Request message to a called UE.

S1002. The MSC receives a PS to CS Handover Request message sent from the MME, where the PS to CS Handover Request message includes information required for CS handover, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB.

S1003. The MSC sends an ACM to a calling UE according to the PS to CS Handover Request message, obtains CS resource information prepared by a target BSS/RNS from the target BSS/RNS, and returns a PS to CS Handover Response message to the MME, where the PS to CS Handover Response message includes the CS resource information prepared by the target BSS/RNS so that the MME sends a Handover Command message to the called UE through an eNB, where the Handover Command message includes the CS resource information prepared by the target BSS/RNS so that the called UE accesses a 2G/3G network.

After the called UE accesses the 2G/3G network, if the MSC receives a Handover Complete message sent by the called UE, the MSC may send a Notification message to the calling UE, notifying that the called party goes off-hook.

It can be seen that, with respect to the called UE, when receiving an incoming call, the MSC sends a CS Paging Request message to the MME; and when receiving a PS to CS Handover Request message from the MME, the MSC sends an ACM to the calling MSC. Moreover, the MSC adds the resource information prepared by the target BSS/RNS to the PS to CS Handover Response message returned to the MME; when receiving a Handover Complete message from the called UE, the MSC sends a Notification message to the calling UE, notifying that the called party goes off-hook. In this process, the CS handover process and the processing of the CS core network are executed in parallel. In this way, the delay may be reduced and the user experience may be improved.

The following describes a method for voice call fallback to a CS domain in a process where a UE serves as a called party to receive a call through two application scenarios.

Embodiment 7

Figure 11:
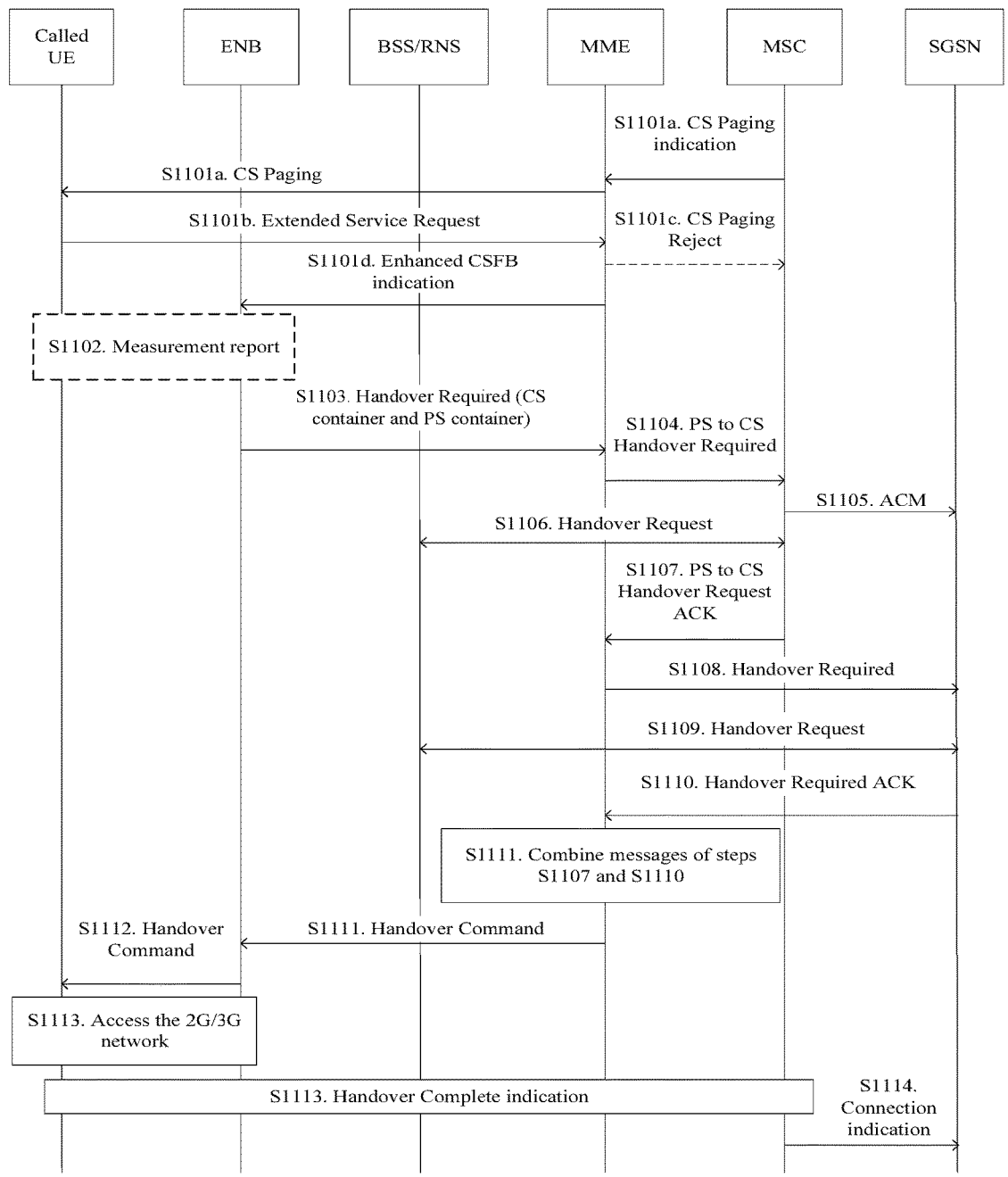
FIG. 11 is a flowchart showing a method for voice call fallback to a CS domain according to a seventh embodiment of the present invention.

In this embodiment, a UE is a called UE, and a 2G/3G network supports PS handover. The following describes the procedure for voice call fallback to a CS domain in a process where the UE receives a call. As shown in FIG. 11, the specific steps are as follows:

S1101a. After receiving an incoming call, an MSC sends a CS Paging Request message to an MME; if a called UE is in an active state, the MME directly sends a CS Paging message to the called UE, where the message may include a calling number. If the called UE is in an idle state, the MME sends a Paging message to an eNB, indicating that the paging is CS paging; the eNB pages the called UE on an air interface and indicates that it is CS paging.

S1101b. The called UE sends an Extended Service Request message to the MME. If the calling number is already obtained in step S1101a, indicating information is included to indicate whether the called UE accepts the call. If the called UE does not obtain the calling number in step S1101a, the called UE may add indicating information to the Extended Service Request message, indicating that the called UE expects to obtain the calling number (the indication is optional); the MME sends the calling number to the called UE through a CS Service Notification message in a Non-Access-Stratum (NAS) message; then, the called UE determines whether to accept the call, and instructs the MME whether the call is accepted by resending an Extended Service Request message in a NAS message to the MME.

S1101c. If the called UE rejects the call, the MME sends a Reject message to the MSC, and the call is ended.

S1101d. If the called UE accepts the call, the MME sends a message to the eNB, indicating that the call is an enhanced CSFB call.

S1102. Optionally, the eNB triggers measurement.

The eNB may require the called UE to measure the signal quality of the 2G/3G network. The called UE reports a measurement result. If the eNB confirms that the reported signal quality of the 2G/3G network satisfies the preset signal quality requirement, step S1103 is executed.

S1103. The eNB sends a Handover Request message to the MME, and adds information required for PS handover and information required for CS handover to the Handover Request message according to the information indicating the call is an enhanced CSFB call in step S901d.

Being identical with step S703 in the third embodiment, the eNB may construct a PS transparent container and a CS transparent container respectively, which are used to bear the information required for PS handover and information required for CS handover respectively. The information required for PS handover encapsulated in the PS transparent container and the information required for CS handover encapsulated in the CS transparent container comply with the existing 2G/3G network specifications and are the target ID of the PS handover and the target ID of the CS handover respectively. The eNB may ensure they are the same.

S1104. The MME selects an MSC, and sends a PS to CS Handover Request message to the MSC, where the PS to CS Handover Request message includes information required for CS handover.

As described in step S1103, the information required for CS handover may be encapsulated in the CS transparent container.

The MSC selected by the MME is an upgraded MSC that can support enhanced CSFB. If only some MSCs in the network are upgraded, the MME must select an MSC that can support enhanced CSFB. Therefore, the MME cannot ensure that the selected MSC is consistent with the MSC corresponding to the LA of a target cell. If the selected MSC is inconsistent with the MSC corresponding to the LA of the target cell, the MSC triggers a procedure of inter-MSC handover, which is described in the following procedure.

If all MSCs in the network are upgraded to support enhanced CSFB, the MME may select the corresponding MSC according to the LA of a target cell. Under this circumstance, inter-MSC handover does not occur. The MME sends a PS to CS Handover Request message to the MSC, where the PS to CS Handover Request message carries a CS transparent container that bears information required for CS handover.

S1105. If it is an inter-MSC call, the MSC sends an ACM.

S1106. If the MSC determines that the target MSC is not itself (according to the target ID), the MSC performs inter-MSC handover, and the target MSC commands a target BSS/RNS to prepare CS resources. If the MSC determines that the target MSC is itself, the MSC sends a Handover Request message to the target BSS/RNS, and the target BSS/RNS prepares CS resources.

It is understandable that there is no strict time sequence between step S1105 and step S1106.

S1107. After handover is completed, the MSC returns a PS to CS Handover Complete message to the MME, where the PS to CS Handover Complete message includes the CS resource information prepared by the target BSS/RNS.

In practice, CS resource information prepared by a target BSS/RNS may include a dedicated air interface channel of a CS voice service and system information, which may be encapsulated in a CS transparent container and comply with the CS domain specifications in the existing 2G/3G network.

S1108. The MME sends a Handover Request message to an SGSN, where the Handover Request message includes information required for PS handover.

As described in the preceding, a PS transparent container may be used to bear the information required for PS handover, for example, the target ID required for PS handover.

Step S1108 and step S1104 may occur simultaneously.

S1109. The SGSN sends a Handover Request message to a target BSS/RNS, and the target BSS/RNS returns the prepared PS resource information.

S1110. The SGSN returns a Handover Response message to the MME, where the Handover Response message includes the PS resource information prepared by the target BSS/RNS.

In practice, PS resource information prepared by a target BSS/RNS may include an air interface channel of a PS service and system information, which may be encapsulated in a PS transparent container and comply with the PS domain specifications in the existing 2G/3G network.

S1111. After the messages in steps S1107 and S1110 are received, the MME combines the two messages and combines the PS resource information and the CS resource information, and sends a Handover Command message to the eNB, where the Handover Command message includes the combined resource information.

In practice, the PS to CS Handover Complete message includes the CS resource information prepared by the target BSS/RNS (mainly including the dedicated air interface channel of the CS voice service and the system information, which are encapsulated in the CS transparent container and comply with the CS domain specifications in the existing 2G/3G network), and the Handover Request ACK message includes PS resource information (mainly including the air interface channel of the PS service and the system information, which are encapsulated in the PS transparent container and comply with the CS specifications in the existing 2G/3G network). The CS transparent container is combined with the PS transparent container to form a combined transparent container, which is used to bear resources prepared by a target BSS/RNS.

S1112. The eNB sends a Handover Command message to the called UE, where the Handover Command message includes resource information prepared by a target BSS/RNS.

S1113. The UE accesses the 2G/3G network, and sends a Handover Complete message to the target BSS/RNS; the target BSS/RNS sends the Handover Complete message to the target MSC, and the target MSC sends the Handover Complete message to the original MSC.

S1114. After receiving the Handover Complete message, the selected MSC sends an ANM.

It can be seen that, in this embodiment, the called connection time mainly consists of the following time segments: random paging time in an LTE network (corresponding to step S1101a if a UE is in an idle state), random access time in the LTE network (corresponding to step S1101b if the UE is in an idle state), time for measuring a 2G/3G network (optionally, corresponding to step S1102), MAX (PS handover time, corresponding to steps S1108 to S1110), CS handover time (corresponding to steps S1104, and S1106 to S1107), and processing time of a CS core network (corresponding to step S1105). In comparison with the called connection time in the CSFB technical solution illustrated in FIG. 2, the main difference is that: In this embodiment, MAX replaces the PS handover time, time for reading information about the CS domain system, roaming retry time of the MSC (corresponding to the scenario where the called MSC has changed), and processing time of the CS core network in the solution of FIG. 2; in this embodiment, CS handover, PS handover, and processing of the CS core network are parallel rather than serial in the solution of FIG. 2. Therefore, the MAX duration depends on only the longest time of these three processes. Compared with the method for voice call fallback to a CS domain in the scenario where a UE serves as a called party to receive a call in the CSFB solution shown in FIG. 2, the method in this embodiment may reduce the delay and improve the user experience.

Embodiment 8

In this embodiment, a UE is a called UE, and a 2G/3G network does not support PS handover. For the procedure for the called UE receiving paging during the execution of voice call fallback to a CS domain, see steps S1101a to S1101d in the seventh embodiment. For other procedures, see the procedure executed in the scenario where the UE is a calling UE and the 2G/3G network does not support PS handover in the fourth embodiment. Similarly, because the 2G/3G network does not support PS handover, after accessing the 2G/3G network, the UE sends a PS Service Suspend message to an SGSN; the SGSN notifies an MME; and the MME instructs an SGW to update the bearer. The service suspension procedure is an existing procedure, and there is no further description here.

Similarly, because CS handover and processing of a CS core network are parallel rather than serial, compared with the method for voice call fallback to a CS domain in the scenario where the UE serves as a called party to receive a call in the solution of FIG. 2, the method in this embodiment may reduce the delay and improve the user experience.

It is understandable that, for the called UE, the following process is not only applicable to the process of voice call fallback to a CS domain in embodiments of the present invention but also applicable to the CSFB process in the prior art.

When receiving a CS Paging Request message from an MSC, the MME sends a CS Paging Request message to the called UE through an eNB; the MME receives a Service Request message from the called UE, and sends a CS Service Indication message to the called UE, where the CS Service Indication message includes a calling number; the MME receives a Service Request message from the called UE, where the Service Request message includes information indicating whether the call is accepted; if the called UE accepts the call, the MME instructs the eNB to initiate CSFB handover, or instructs the eNB that the called UE wants to initiate a CSFB call in the CSFB technical solution shown in FIG. 2, and then the subsequent CSFB procedures in the CSFB technical solution illustrated in FIG. 2 may be executed, and there is no further description here.

In the CSFB technical solution illustrated in FIG. 3, when the called UE receives a call, if the MSC processing the call has changed and is different from the MSC where the UE is attached to, the MSC returns a Reject message to the UE so that the UE reinitiates location update to attach to the MSC. This procedure is referred as to a roaming retry procedure. In the CSFB technical solution illustrated in FIG. 3, the CSFB procedure is executed first, namely, the UE does not send a Location Update message to trigger a roaming retry procedure until PS handover is completed. In this embodiment, a roaming retry procedure may be executed in parallel with a PS handover procedure, so that the time of voice call fallback to a CS domain may be shortened. The MME receives a PS Handover Request message from the eNB, and determines that the new MSC to be accessed by the called UE is different from the MSC where the called UE is currently registered according to the information required for PS handover in the PS Handover Request message, and sends a Setup Request message to the new MSC, so that the new MSC sends a Location Update message to an HLR and executes a location update procedure. The following describes the method with reference to a specific embodiment.

Embodiment 9

Figure 12:
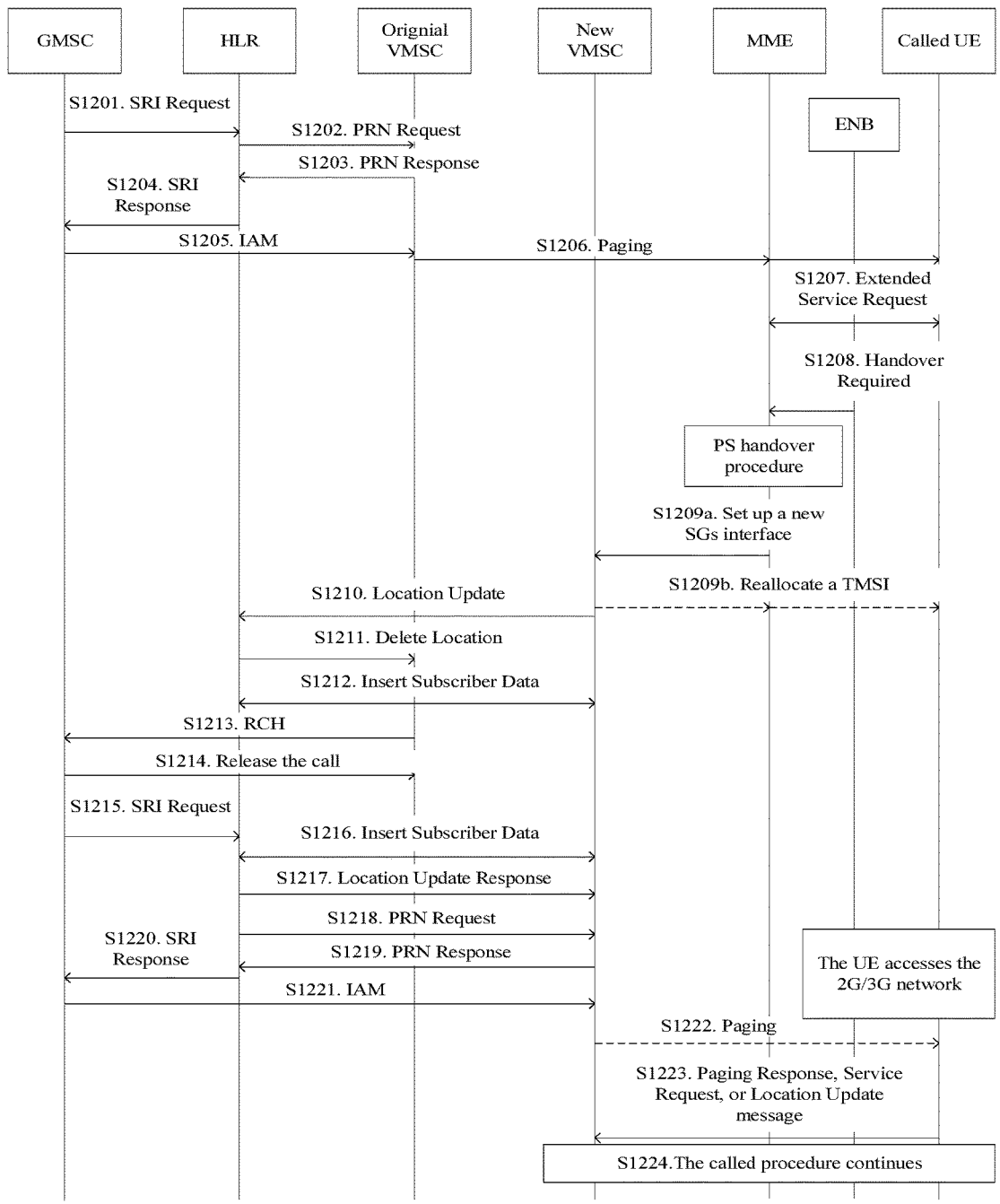
FIG. 12 is a flowchart showing a method for voice call fallback to a CS domain according to a ninth embodiment of the present invention.

As shown in FIG. 12, the specific steps are as follows:

S1201. A GMSC sends an SRI Request message to an HLR.

S1202. The HLR sends a PRN Request message to the MSC where the called UE is registered.

S1203. The MSC where the called UE is registered returns a Response message to provide a roaming number.

S1204. The HLR returns an SRI Response ACK.

S1205. The GMSC sends an IAM to the registered MSC of the called UE.

S1206. The MSC starts to page the called UE.

S1207. The called UE sends an Extended Service Request message to the MME.

S1208. An eNB sends a Handover Required message to the MME and initiates a PS handover procedure.

Optionally, before sending the Handover Required message to the MME, the eNB commands the called UE to perform measurement, and the called UE submits a measurement report.

S1209a. The MME determines that the MSC to be accessed by the called UE is different from the MSC where the called UE is currently registered, and initiates setup of an SGs interface to the new MSC; the MME may judge whether the MSC has changed according to the target ID of PS handover.

The MME may replace the UE to send a Location Update message so as to set up a new SGs interface. The judging standard of the MME is: judging whether the corresponding MSC is consistent with the MSC where the called UE is registered according to PS related information of a target BSS/RNS in a PS Handover message, such as a BSS/RNS ID.

S1209b. The new MSC returns a Location Update Response message, and allocates a new TMSI and a new location area identity (LAI). If PS handover is not completed yet (the MME has not sent a Handover Command message to the eNB, or the MME does not send a Handover Command message to the eNB before this time), the MME sends information about a new LAI and a new TMSI to the UE through a NAS message. The information may be sent by extending a global unique temporary identity (GUTI) reallocation message in an LTE network or defining a new message. The MME may also select not to send the information to the UE.

Step S1209b may be executed immediately after step S1209a, and may also be executed after step S1217. To improve the access rate, step S1209b may be executed after step S1209a.

Steps S1210 to S1221 are the same as those in the CSFB technical solution illustrated in FIG. 3, and there is no further description here.

S1222. Optionally, the new MSC pages the called UE.

If the called UE is already in an active state in a 2G/3G network, or the MSC waits for the called UE to set up a NAS connection, the new MSC may page the called UE.

S1223. To set up a NAS connection with the MSC, the UE should actively send a Paging Response message, a Service Request message, or a Location Update message, including an IMSI or a TMSI. If the LAI of the cell where the UE is currently attached to is inconsistent with the registered LAI, the IMSI is used; if the LAI of the cell where the UE is currently attached to is consistent with the registered LAI, the TMSI is used.

S1224. The CS call procedure is continued and is the same as that in the CSFB solution illustrated in FIG. 3, and there is no further description here.

It can be seen that, in this embodiment, a roaming retry procedure is executed in advance in parallel with a PS handover procedure. In this way, a parallel operation replaces a serial operation. Therefore, the delay may be reduced and the user experience may be improved.

Embodiments of the present invention further provide apparatuses and systems corresponding to the preceding methods. Apparatuses and systems are described in detail in the following.

Embodiment 10

Figure 13:
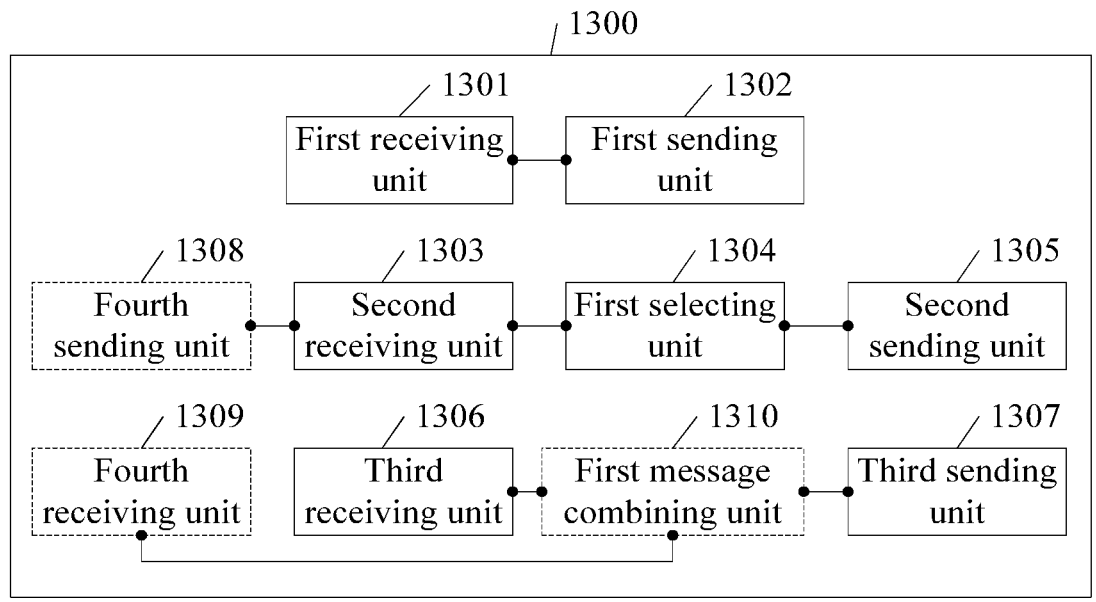
FIG. 13 is a schematic diagram showing a structure of an MME according to a tenth embodiment of the present invention.

As shown in FIG. 13, an MME 1300 includes:

a first receiving unit 1301, configured to receive a Service Request message from a calling UE, where the Service Request message includes called number information of a voice call in a CS domain;

a first sending unit 1302, configured to instruct an eNB to initiate CSFB handover when the first receiving unit 1301 receives the Service Request message from the calling UE;

a second receiving unit 1303, configured to receive a Handover Request message from the eNB, where the Handover Request message includes information required for CS handover;

a first selecting unit 1304, configured to select an MSC when the second receiving unit 1303 receives the Handover Request message from the eNB;

a second sending unit 1305, configured to send a PS to CS Handover Request message to the MSC selected by the first selecting unit 1304, where the PS to CS Handover Request message includes information required for the CS handover and a called number r so that the MSC calls a called UE;

a third receiving unit 1306, configured to receive a PS to CS Handover Response message returned by the MSC, where the PS to CS Handover Response message includes CS resource information prepared by a target BSS/RNS; and a third sending unit 1307, configured to send a Handover Command message to the calling UE through the eNB when the third receiving unit 1306 receives the PS to CS Handover Response message, where the Handover Command message includes the CS resource information prepared by the target BSS/RNS so that the calling UE can access a 2G/3G network.

The MME supports voice call fallback to a CS domain in the scenario where a calling UE initiates a call. Because CS handover and the processing of a CS core network are executed in parallel, the delay may be reduced and the user experience may be improved.

If the 2G/3G network supports PS handover, the MME may be extended on the basis of the tenth embodiment, and the extension is described as follows:

If the Handover Request message received by the second receiving unit 1303 further includes information required for PS handover, the MME 1400 further includes:

a fourth sending unit 1308, configured to send a Handover Request message to an SGSN after the second receiving unit receives the Handover Request message, where the Handover Request message includes information required for PS handover;

a fourth receiving unit 1309, configured to receive a Handover Request ACK message returned by the SGSN, where the Handover Request ACK message includes the PS resource information prepared by the target BSS/RNS; and a first message combining unit 1310, configured to combine the PS to CS Handover Response message received by the third receiving unit 1306 and the Handover Request ACK message received by the fourth receiving unit 1309.

The Handover Command message sent by the third sending unit 1307 further includes the PS resource information prepared by the target BSS/RNS.

The MME in this embodiment can support that CS handover, processing of a CS core network, and PS handover are executed in parallel. The delay of the three processes depends on the longest time of these three processes rather than the time sum of these three processes. Therefore, the delay may be reduced and the user experience may be improved.

Embodiment 11

Figure 14:
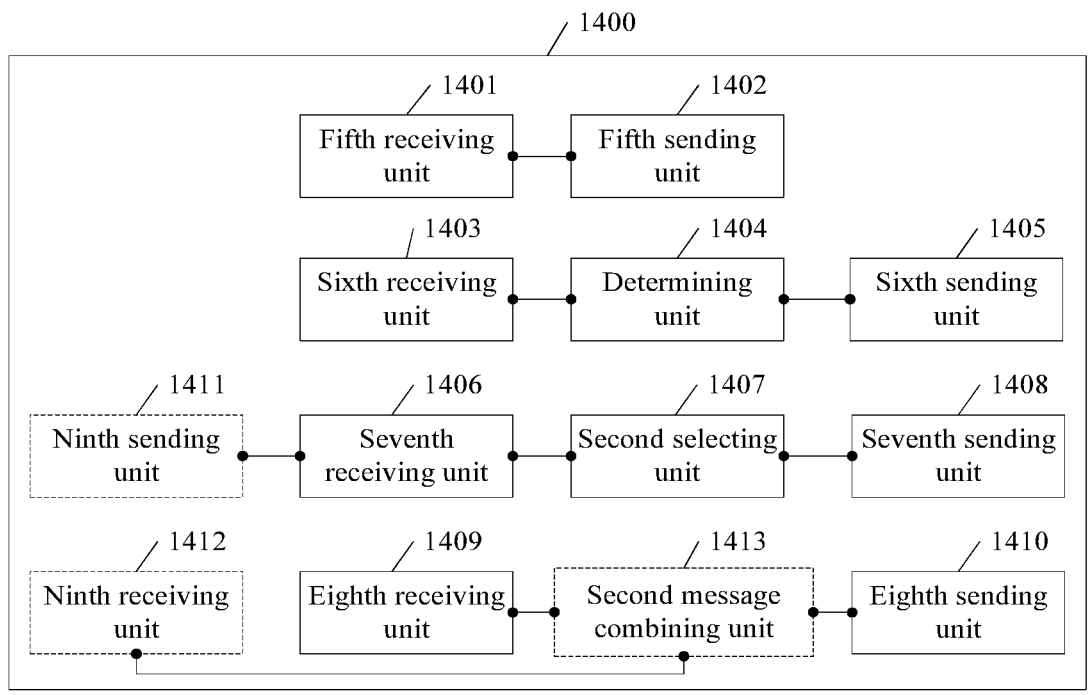
FIG. 14 is a schematic diagram showing a structure of an MME according to an eleventh embodiment of the present invention.

As shown in FIG. 14, an MME 1400 includes:

a fifth receiving unit 1401, configured to receive a CS Paging Request message from an MSC;

a fifth sending unit 1402, configured to send a CS Paging Request message to a called UE through an eNB when the fifth receiving unit 1401 receives the CS Paging Request message from the MSC;

a sixth receiving unit 1403, configured to receive a Handover Request message from the called UE;

a determining unit 1404, configured to determine that the called UE accepts the call when the sixth receiving unit 1403 receives the Handover Request message from the called UE;

a sixth sending unit 1405, configured to send a message instructing the eNB to initiate CSFB handover;

a seventh receiving unit 1406, configured to receive a Handover Request message from the eNB, where the Handover Request message includes information required for CS handover;

a second selecting unit 1407, configured to select an MSC when the seventh receiving unit 1406 receives the Handover Request message;

a seventh sending unit 1408, configured to send a PS to CS Handover Request message to the MSC selected by the second selecting unit 1407, where the PS to CS Handover Request message includes information required for CS handover so that the MSC sends an ACM to a calling UE;

an eighth receiving unit 1409, configured to receive a PS to CS Handover Response message returned by the MSC, where the PS to CS Handover Response message carries CS resource information prepared by a target BSS/RNS; and an eighth sending unit 1410, configured to send a Handover Command message to the called UE through the eNB when the eighth receiving unit 1409 receives the PS to CS Handover Response message, where the Handover Command message includes the CS resource information prepared by the target BSS/RNS so that the calling UE can access a 2G/3G network.

The MME 1400 supports voice call fallback to a CS domain in the scenario where the UE receives a call. Because CS handover and the processing of the CS core network are executed simultaneously, the delay may be reduced and the user experience may be improved.

Furthermore, if the 2G/3G network supports PS handover, the MME 1400 may be further extended, and the extension is as follows:

The Handover Request message received by the seventh receiving unit 1406 further includes information required for PS handover.

The MME 1400 further includes:

a ninth sending unit 1411, configured to send a Handover Request message to an SGSN, where the Handover Request message includes the information required for the PS handover;

a ninth receiving unit 1412, configured to receive a Handover Request ACK message returned by the SGSN, where the Handover Request ACK message includes the PS resource information prepared by the target BSS/RNS; and a second message combining unit 1413, configured to combine the PS to CS Handover Response message received by the eighth receiving unit 1409 and the Handover Request ACK message received by the ninth receiving unit 1412.

The Handover Command message sent by the eighth sending unit 1410 further includes the PS resource information prepared by the target BSS/RNS.

The MME in this embodiment can support that CS handover, processing of a CS core network, and PS handover are executed in parallel. The delay of the three processes depends on the longest time of these three processes rather than the time sum of these three processes. Therefore, the delay may be reduced and the user experience may be improved.

Embodiment 12

Figure 15:
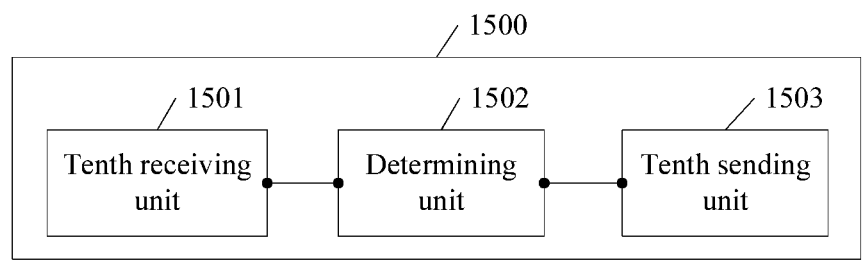
FIG. 15 is a schematic diagram showing a structure of an MME according to a twelfth embodiment of the present invention.

As shown in FIG. 15, an MME 1500 includes:

a tenth receiving unit 1501, configured to receive a PS Handover Request message from an eNB, where the PS Handover Request message includes information required for PS handover;

a determining unit 1502, configured to determine that a new MSC to be accessed by a called UE is different from an MSC where the called UE is currently registered according to the information required for the PS handover; and a tenth sending unit 1503, configured to send a Location Update message to the new MSC when the determining unit 1502 determines that the new MSC to be accessed by the called UE is different from the MSC where the called UE is currently registered, so that the new MSC sends a Location Update message to an HLR for executing a location update procedure and a roaming retry procedure.

The MME in this embodiment supports advance execution of a roaming retry procedure. Because a roaming retry procedure and a PS handover procedure are executed in parallel, and a parallel operation replaces a serial operation, the delay may be reduced and the user experience may be improved.

Embodiment 13

Figure 16:
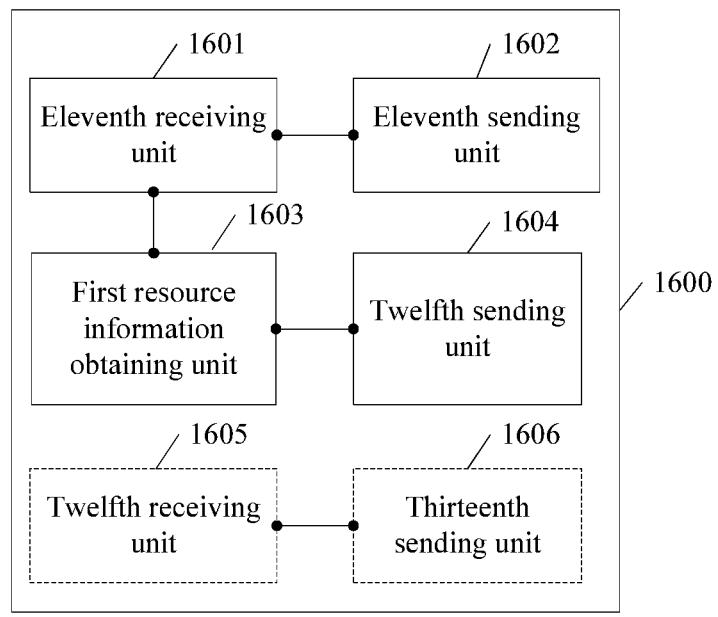
FIG. 16 is a schematic diagram showing a structure of an MSC according to a thirteenth embodiment of the present invention.

As shown in FIG. 16, an MSC 1600 includes:

an eleventh receiving unit 1601, configured to receive a PS to CS Handover Request message from an MME, where the PS to CS Handover Request message includes information and a called number required for CS handover, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB;

an eleventh sending unit 1602, configured to send an IAM for calling a called UE according to the called number;

a first resource information obtaining unit 1603, configured to obtain CS resource information prepared by a target BSS/RNS according to the information required for the CS handover; and a twelfth sending unit 1604, configured to return a PS to CS Handover Response message to the MME, and return the CS resource information obtained by the first resource information obtaining unit 1603 to the MME so that the MME sends a Handover Command message to a calling UE through an eNB, where the Handover Command message includes the CS resource information prepared by the target BSS/RNS so that the calling UE can access a 2G/3G network.

Because the PS to CS Handover message received by the MSC from the MME includes information and a called number required for CS handover, the MSC may execute the following two processes in parallel: sending an IAM to the called UE, and returning the CS resource information prepared by and obtained from the target BSS/RNS to the MME through the PS to CS Handover Response message, namely, executing the processing of the CS core network and the CS handover process in parallel. In this way, the delay may be reduced and the user experience may be improved.

In practice, as shown in each unit represented by a dashed-line block in FIG. 16, the MSC 1600 may further include:

a twelfth receiving unit 1605, configured to receive an ANM from a called UE; and a thirteenth sending unit 1606, configured to send a Notification message to a calling UE when receiving the ANM from the called UE, where the Notification message notifies that the called UE goes off-hook and starts a conversation.

The signaling messages represented by dashed-line blocks, dashed-line connections, or dashed lines are optional.

Embodiment 14

Figure 17:
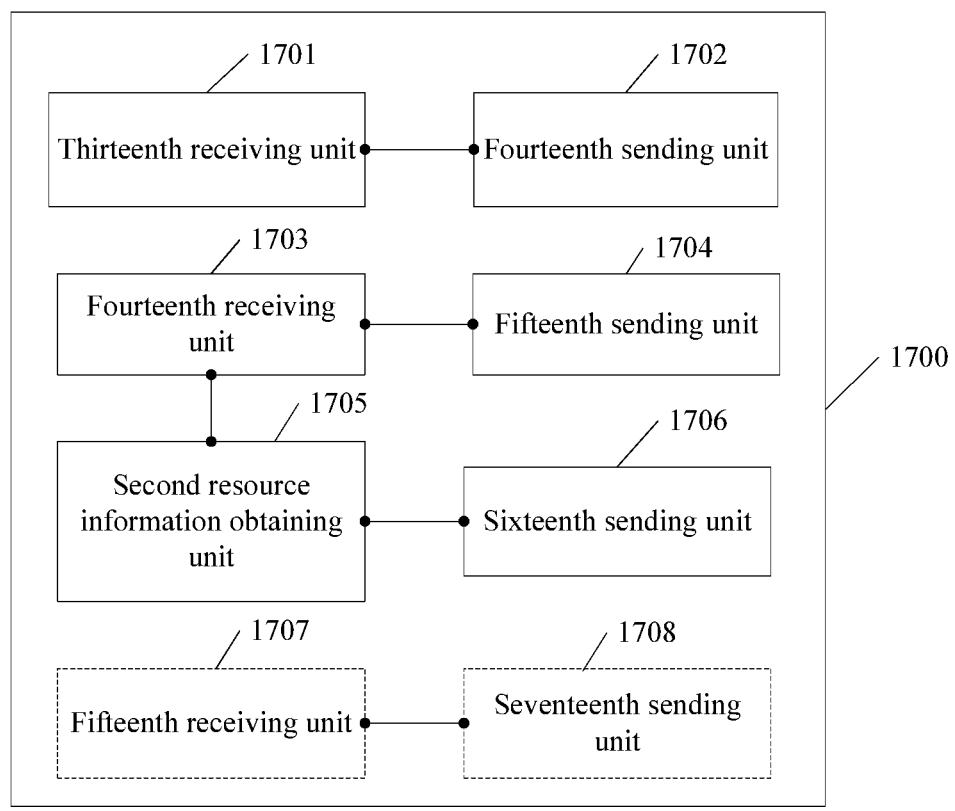
FIG. 17 is a schematic diagram showing a structure of an MSC according to a fourteenth embodiment of the present invention.

As shown in FIG. 17, an MSC 1700 includes:

a thirteenth receiving unit 1701, configured to receive an incoming call;

a fourteenth sending unit 1702, configured to send a CS Paging Request message to an MME when the thirteenth receiving unit receives the incoming call so that the MME sends a CS Paging message to a called UE;

a fourteenth receiving unit 1703, configured to receive a PS to CS Handover Request message from the MME, where the PS to CS Handover Request message includes information required for CS handover, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB;

a fifteenth sending unit 1704, configured to send an ACM to a calling UE according to the PS to CS Handover Request message;

a second resource information obtaining unit 1705, configured to obtain CS resource information prepared by a target BSS/RNS according to the information required for the CS handover; and a sixteenth sending unit 1706, configured to return a PS to CS Handover Response message to the MME, and return the CS resource information obtained by the second resource information obtaining unit 1705 to the MME so that the MME sends a Handover Command message to the called UE through an eNB, where the Handover Command message includes the CS resource information prepared by the target BSS/RNS so that the called UE accesses a 2G/3G network.

Because the PS to CS Handover message received by the MSC from the MME includes information required for CS handover, the MSC may execute the following two processes in parallel: returning an ACM to the calling UE, and returning the CS resource information prepared by and obtained from the target BSS/RNS to the MME through the PS to CS Handover Response message. That is, the processing of the CS core network and the CS handover process are executed in parallel. In this way, the delay may be reduced and the user experience may be improved.

In practice, as shown in dashed-line blocks in FIG. 17, the MSC 1700 may further include:

a fifteenth receiving unit 1707, configured to receive a Handover Complete message from the called UE; and a seventeenth sending unit 1708, configured to send a Notification message to the calling UE when the fifteenth receiving unit 1707 receives the Handover Complete message, where the Notification message notifies that the called UE goes off-hook.

Embodiments of the present invention further provide the following communication systems.

Embodiment 15

Figure 18:
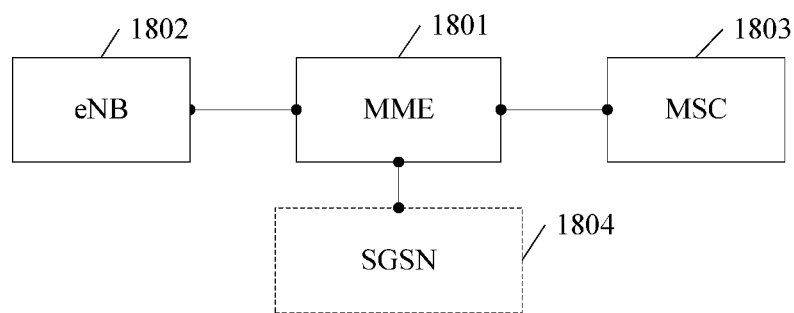
FIG. 18 is a schematic diagram showing a structure of a communication system according to a fifteenth embodiment of the present invention.

As shown in FIG. 18, a communication system includes: an MME 1801, an eNB 1802, and an MSC 1803.

The MME 1801 is configured to: receive a Service Request message from a calling UE, where the Service Request message includes called number information of a voice call in a CS domain, and send to the eNB 1802 a message for instructing the eNB 1802 to initiate CSFB handover; receive a Handover Request message from the eNB 1802, where the Handover Request message includes information required for CS handover, select the MSC 1803, and send a PS to CS Handover Request message to the MSC 1803, where the PS to CS Handover Request message includes information required for the CS handover and a called number; receive a PS to CS Handover Response message returned by the MSC 1803, where the PS to CS Handover Response message includes CS resource information prepared by a target BSS/RNS, and send a Handover Command message to the calling UE through the eNB 1802, where the Handover Command message includes the CS resource information prepared by the target BSS/RNS so that the calling UE can access a 2G/3G network.

The eNB 1802 is configured to: receive the message for instructing the eNB 1802 to initiate CSFB handover from the MME 1801, send a Handover Request message to the MME 1801, where the Handover Request message includes information required for CS handover, and receive a Handover Command message from the MME 1801 and forward the Handover Command message to the calling UE, where the Handover Command message includes CS resource information prepared by a target BSS/RNS so that the calling UE can access a 2G/3G network.

The MSC 1803 is configured to: receive a PS to CS Handover Request message from the MME 1801, where the PS to CS Handover Request message includes the information required for the CS handover and the called number, send an IAM to call a called UE according to the called number, obtain CS resource information prepared by a target BSS/RNS according to the information required for the CS handover, and return a PS to CS Handover Response message to the MME 1801, where the PS to CS Handover Response message includes CS resource information prepared by a target BSS/RNS.

The communication system in this embodiment supports voice call fallback to a CS domain in the scenario where the calling UE initiates a call. Because CS handover and the processing of a CS core network are executed in parallel, the delay may be reduced and the user experience may be improved.

In practice, the MSC 1803 may be further configured to: after receiving an ACM returned from the called UE and a Handover Complete message sent by the calling UE, instruct the calling UE to start alerting; after receiving an ANM from the called UE, send a Notification message to the calling UE, notifying that the called UE goes off-hook and starts a conversation.

In practice, if a 2G/3G network supports PS handover, as shown in FIG. 18, the Handover Request message sent by the eNB 1802 to the MME 1801 may further includes information required for PS handover.

The communication system may further include:

an SGSN 1804, configured to receive a Handover Request message sent by the MME 1801, where the Handover Request message includes information required for PS handover, and return a Handover Request ACK message to the MME 1801; and the MME 1801, further configured to: send a Handover Request message to the SGSN 1804, receive a Handover Request ACK message returned by the SGSN 1804, and combine the Handover Request ACK message and the PS to CS Handover Response message so that the sent Handover Command message further includes the PS resource information prepared by the target BSS/RNS.

By extending the SGSN 1804, the communication system can support that CS handover, processing of a CS core network, and PS handover are executed in parallel. The delay of the three processes depends on the longest time of these three processes rather than the time sum of these three processes. Therefore, the delay may be further reduced and the user experience may be improved.

Embodiment 16

Figure 19:
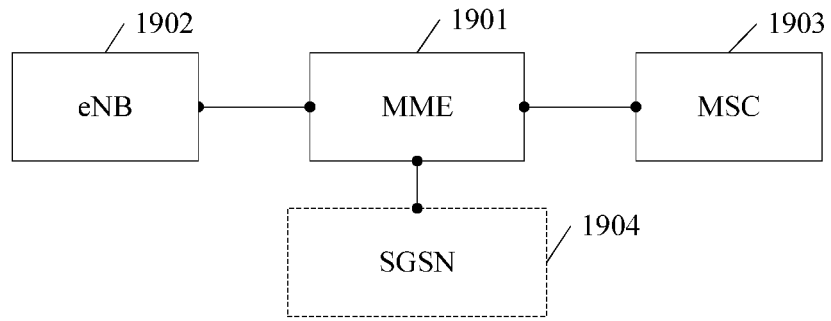
FIG. 19 is a schematic diagram showing a structure of a communication system according to a sixteenth embodiment of the present invention.

As shown in FIG. 19, a communication system includes: an MME 1901, an eNB 1902, and an MSC 1903.

The MME 1901 is configured to: send a CS Paging Request message to a called UE through the eNB 1902 when receiving a CS Paging Request message from the MSC 1903; receive a Service Request message from the called UE, where the Service Request message includes called number information of a voice call in a CS domain, and send to the eNB 1902 a message instructing the eNB to initiate CSFB handover; receive a Handover Request message from the eNB 1902, where the Handover Request message includes information required for CS handover, select the MSC 1903, and send a PS to CS Handover Request message to the MSC 1903, where the PS to CS Handover Request message includes the information required for the CS handover so that the MSC 1903 returns an ACM to a calling UE; receive a PS to CS Handover Response message returned by the MSC 1903, where the PS to CS Handover Response message includes CS resource information prepared by a target BSS/RNS, and send a Handover Command message to the called UE through the eNB 1902, where the Handover Command message includes the CS resource information prepared by the target BSS/RNS so that the called UE accesses a 2G/3G network.

The eNB 1902 is configured to: receive the message for instructing the eNB 1902 to initiate CSFB handover from the MME 1901, send a Handover Request message to the MME 1901, where the Handover Request message includes information required for CS handover, and receive a Handover Command message from the MME 1901 and forward the Handover Command message to the called UE, where the Handover Command message includes CS resource information prepared by a target BSS/RNS so that the called UE accesses a 2G/3G network.

The MSC 1903 is configured to: receive a PS to CS Handover Request message from the MME 1901, where the PS to CS Handover Request message includes the information required for the CS handover, send an ACM to the calling UE, obtain CS resource information prepared by a target BSS/RNS according to the information required for the CS handover, and return a PS to CS Handover Response message to the MME 1901, where the PS to CS Handover Response message includes CS resource information prepared by a target BSS/RNS.

The communication system in this embodiment supports voice call fallback to a CS domain in the scenario where the called UE receives a call. Because CS handover and the processing of a CS core network are executed in parallel, the delay may be reduced and the user experience may be improved.

In practice, the MSC 1903 may be further configured to send a Notification message to the calling UE when receiving a Handover Complete message from the called UE, where the Notification message notifies that the called UE goes off-hook.

In practice, if a 2G/3G network supports PS handover, as shown in FIG. 19, the Handover Request message sent by the eNB 1902 to the MME 1901 further includes information required for PS handover.

The communication system may further include:

an SGSN 1904, configured to receive a Handover Request message sent by the MME 1901, where the Handover Request message includes information required for PS handover, and return a Handover Request ACK message to the MME 1901; and the MME 1901, further configured to: send a Handover Request message to the SGSN 1904, receive a Handover Request ACK message returned by the SGSN 1904, and combine the Handover Request ACK message and the PS to CS Handover Response message so that the sent Handover Command message further includes the PS resource information prepared by the target BSS/RNS.

By extending the SGSN 1904, the communication system can support that CS handover, processing of a CS core network, and PS handover are executed in parallel. The delay of the three processes depends on the longest time of these three processes rather than the time sum of these three processes. Therefore, the delay may be further reduced and the user experience may be improved.

Embodiment 17

In this embodiment, a UE is a calling UE, and a 2G/3G network supports PS handover. The following describes the procedure for voice call fallback to a CS domain in a process where a UE initiates a call.

Figure 20:
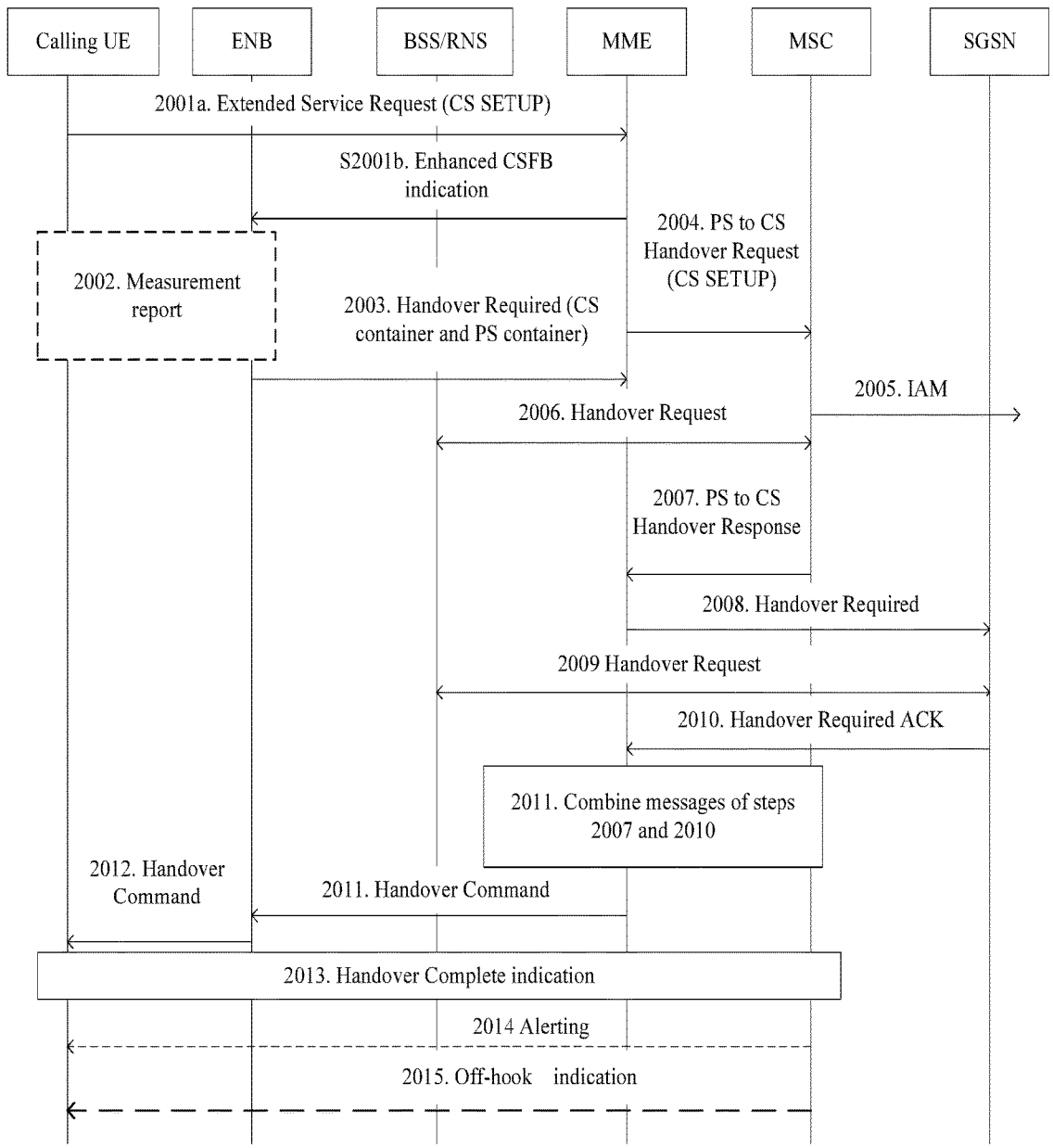
FIG. 20 is a flowchart showing a method for voice call fallback to a CS domain according to a seventeenth embodiment of the present invention.

As shown in FIG. 20, the specific steps are as follows:

2001*a*. A user wants to initiate a CS voice call, and a calling UE is attached to an LTE network and is in an idle or active state. The UE sends an Extended Service Request message to an MME, where the Extended Service Request message may include a CS SETUP Request. The CS SETUP Request may include call information about a CS domain, such as a called number and transaction ID of a CS domain, and the bearer capability of a UE.

2001*b*. The MME instructs an eNB that the call is an enhanced CSFB call.

The MME needs to confirm whether to initiate an enhanced CSFB procedure. The MME first judges whether the calling UE wants to initiate a CS call. The Extended Service Request message may carry type information of a service to be initiated. The specific service type may be voice call, SMS, data service, or supplementary service; the MME also needs to judge whether an enhanced CSFB call can be initiated mainly according to whether the UE and the eNB support enhanced CSFB. If the call is a CS voice call and carries a called number, and both the calling UE and the eNB support enhanced CSFB, the MME instructs the eNB that the call is an enhanced CSFB call.

Because the implementation of steps 2002 to S2003 is similar to the implementation of steps S702 to S703, steps 2002 to S2003 may be implemented with reference to steps S702 to S703, and there is no further description here.

2004. The MME selects an MSC, and sends a PS to CS Handover Request message to the MSC, where the PS to CS Handover Request message includes information required for CS handover and a CS SETUP Request.

The information required for the CS handover may be encapsulated in a CS transparent container.

The calling number may be transmitted by the calling UE to the MME in step 2001*a*. If the calling UE does not transmit the calling number, the MME may determine the calling number according to the UE number stored by the MME itself, because the MME can obtain the number of the calling UE from an HSS.

The MSC selected by the MME is an upgraded MSC that can support enhanced CSFB. If only some MSCs in the network are upgraded, the MME selects an MSC that can support enhanced CSFB. Therefore, the MME cannot ensure that the selected MSC is consistent with the MSC corresponding to the LA of a target cell. Inconsistent MSCs cause inter-MSC handover, which is described in the following procedure.

If all MSCs in the network are upgraded to support enhanced CSFB, the MME may select the corresponding MSC according to the LA of a target cell. Under this circumstance, inter-MSC handover does not occur. The MME sends a PS to CS Handover Request message to the MSC, where the PS to CS Handover Request message carries a calling number, a called number, and a CS transparent container that bears information required for CS handover. No matter whether the MSC has registration information of the calling UE, the MSC performs a CSFB call for the calling UE.

The MSC may select a more appropriate service type based on the information such as the bearer capability of the UE included in the CS SETUP Request.

2005. The MSC calls the called number, and sends an IAM or an INVITE message if the call needs to be outgoing.

If the call is an inter-MSC call, a SIP-I message or an ISUP message may be used.

Because the implementation of steps 2006 to S2015 is similar to the implementation of steps S706 to 715, steps 2006 to S2015 may be implemented with reference to the implementation of steps S706 to 715.

It can be seen that, in this embodiment, the calling connection time mainly consists of the following time segments: random access time in an LTE network (corresponding to step 2001a if a UE is in an idle state), time for measuring a 2G/3G network (optionally, corresponding to step 2002), MAX (PS handover time, corresponding to steps 2008 to 2010), CS handover time (corresponding to steps 2004, 2006 to 2007), processing time of a CS core network (corresponding to step 2005), and the called connection time (corresponding to steps 2014 to 2015). In comparison with the calling connection time in the CSFB technical solution illustrated in FIG. 1, the main difference is that: In this embodiment, MAX replaces the PS handover time, time for reading information about the CS domain system, location update time (corresponding to the scenario where the calling MSC has changed), and processing time of the CS core network in the solution of FIG. 1; in this embodiment, CS handover, PS handover, and processing of a CS core network are executed in parallel rather than serial in the solution of FIG. 1. Therefore, the MAX duration depends on only the longest time of the three processes. Compared with the method in the solution of FIG. 1, the method in this embodiment may reduce the delay and improve the user experience.

Furthermore, if a 2G/3G network does not support PS handover, a PS service may be suspended with reference to the fourth embodiment; the UE may still add information required for CS handover and a CS SETUP Request to the Service Request message sent to the MME; the MME may also add information required for CS handover and a CS SETUP Request to the PS to CS Handover Request message sent to the MSC.

Embodiment 18

Figure 21:
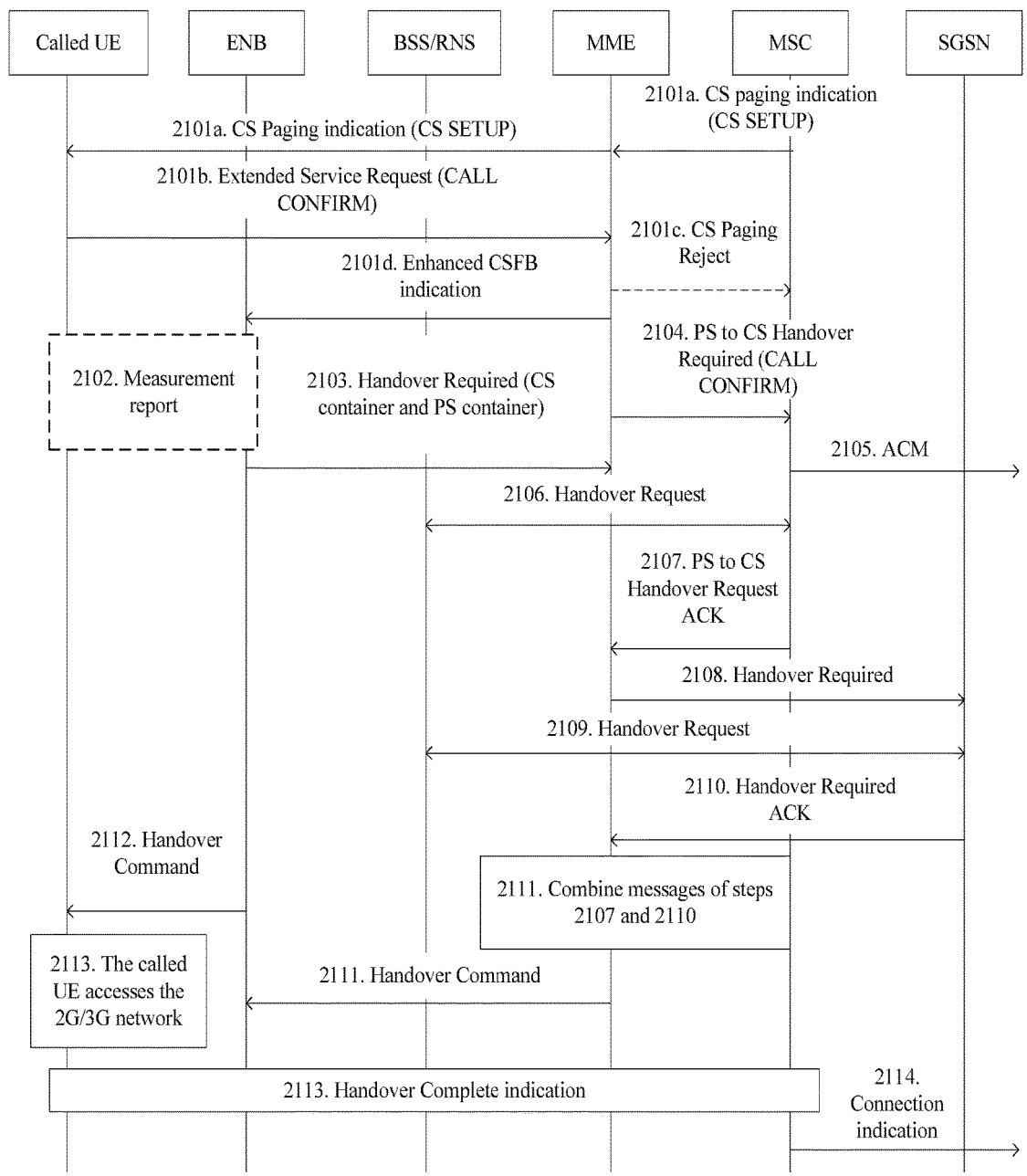
FIG. 21 is a flowchart showing a method for voice call fallback to a CS domain according to an eighteenth embodiment of the present invention.

In this embodiment, a UE is a called UE, and a 2G/3G network supports PS handover. The following describes the procedure for voice call fallback to a CS domain in a process where a UE receives a call. As shown in FIG. 21, the specific steps are as follows:

2101a. After receiving an incoming call, an MSC sends a CS Paging Request message to an MME, where the CS Paging Request message includes a CS SETUP request; if a called UE is in an active state, the MME directly sends a CS Paging message to the called UE, where the CS Paging message may include a CS SETUP Request, and the CS SETUP Request includes information such as a calling number. If the called UE is in an idle state, the MME sends a Paging message to an eNB, indicating that the paging is CS paging; the eNB pages the called UE on an air interface and indicates that it is CS paging.

2101b. The called UE sends an Extended Service Request message to the MME. If a CS SETUP Request is already obtained in step 2101a, the Extended Service Request message includes information indicating whether the called UE accepts the call and may further carry a CALL CONFIRM message. If the called UE does not obtain a CS SETUP Request in step 2101a, the called UE may add indicating information to the Extended Service Request message, indicating the called UE expects to obtain a CS SETUP Request (the indication is optional); the MME may send a CS SETUP Request to the called UE through a CS Service Notification message in a NAS message; the called UE then determines whether to accept the call, and instructs the MME whether the call is accepted by resending an Extended Service Request message in a NAS message to the MME, where the Extended Service Request message may carry a CALL CONFIRM.

2101c. If the called UE rejects the call, the MME sends a Reject message to the MSC, and the call is ended.

2101d. If the called UE accepts the call, the MME sends a message to the eNB, indicating that the call is an enhanced CSFB call.

2102. Optionally, the eNB triggers measurement.

The eNB may require the called UE to measure the signal quality of a 2G/3G network. The called UE reports a measurement result. If the eNB confirms that the reported signal quality of the 2G/3G network satisfies the preset signal quality requirement, step 2103 is executed.

2103. The eNB sends a Handover Request message to the MME, and adds information required for PS handover and information required for CS handover to the Handover Request message according to the information indicating the call is an enhanced CSFB call in step 2101d.

Being identical with step 2003 in the third embodiment, the eNB may construct a PS transparent container and a CS transparent container respectively, which are used to bear the information required for PS handover and information required for CS handover respectively. The information required for PS handover encapsulated in the PS transparent container and the information required for CS handover encapsulated in the CS transparent container comply with the existing 2G/3G network specifications and are the target ID of the PS handover and the target ID of the CS handover respectively. The eNB may ensure they are the same.

2104. The MME selects an MSC, and sends a PS to CS Handover Request message to the MSC, where the PS to CS Handover Request message includes information required for CS handover and a CALL CONFIRM.

The information required for CS handover may be encapsulated in a CS transparent container.

The MSC selected by the MME is an upgraded MSC that can support enhanced CSFB. If only some MSCs in the network are upgraded, the MME must select an MSC that can support enhanced CSFB. Therefore, the MME cannot ensure that the selected MSC is consistent with the MSC corresponding to the LA of a target cell. If the selected MSC is inconsistent with the MSC corresponding to the LA of the target cell, the MSC triggers a procedure of inter-MSC handover.

If all MSCs in the network are upgraded to support enhanced CSFB, the MME may select the corresponding MSC according to the LA of a target cell. Under this circumstance, inter-MSC handover does not occur. The MME sends a PS to CS Handover Request message to the MSC, where the PS to CS Handover Request message carries a CS transparent container that bears information required for CS handover.

Because the implementation of steps 2105 to S2114 is similar to the implementation of steps S1105 to S1114, steps 2105 to S2114 may be implemented with reference to the implementation of steps S1105 to S1114.

It can be seen that, in this embodiment, the called connection time mainly consists of the following time segments: random paging time in an LTE network (corresponding to step 2101a if a user is in an idle state), random access time in the LTE network (corresponding to step S1101b if the user is in an idle state), time for measuring a 2G/3G network (optionally, corresponding to step 2102), MAX (PS handover time, corresponding to steps 2109 to 2110), CS handover time (corresponding to steps 2104, and 2106 to 2107), and processing time of a CS core network (corresponding to step 2105). In comparison with the called connection time in the CSFB technical solution illustrated in FIG. 2, the main difference is that: In this embodiment, MAX replaces the PS handover time, time for reading information about the CS domain system, roaming retry time of the MSC (corresponding to the scenario where the called MSC has changed), and processing time of the CS core network in the solution of FIG. 2; in this embodiment, CS handover, PS handover, and processing of a CS core network are executed in parallel rather than serial in the solution of FIG. 2. Therefore, the MAX duration depends on only the longest time of the three processes. Compared with the method in the solution of FIG. 2, the method in this embodiment may reduce the delay and improve the user experience.

Furthermore, if a 2G/3G network does not support PS handover, a PS service may be suspended with reference to the eighth embodiment; the MSC may still add a CS SETUP Request to the CS Paging Request message sent to the MME; the MME may also add a CS SETUP Request to the CS Paging Request message sent to the UE.

Embodiment 19

Figure 22:
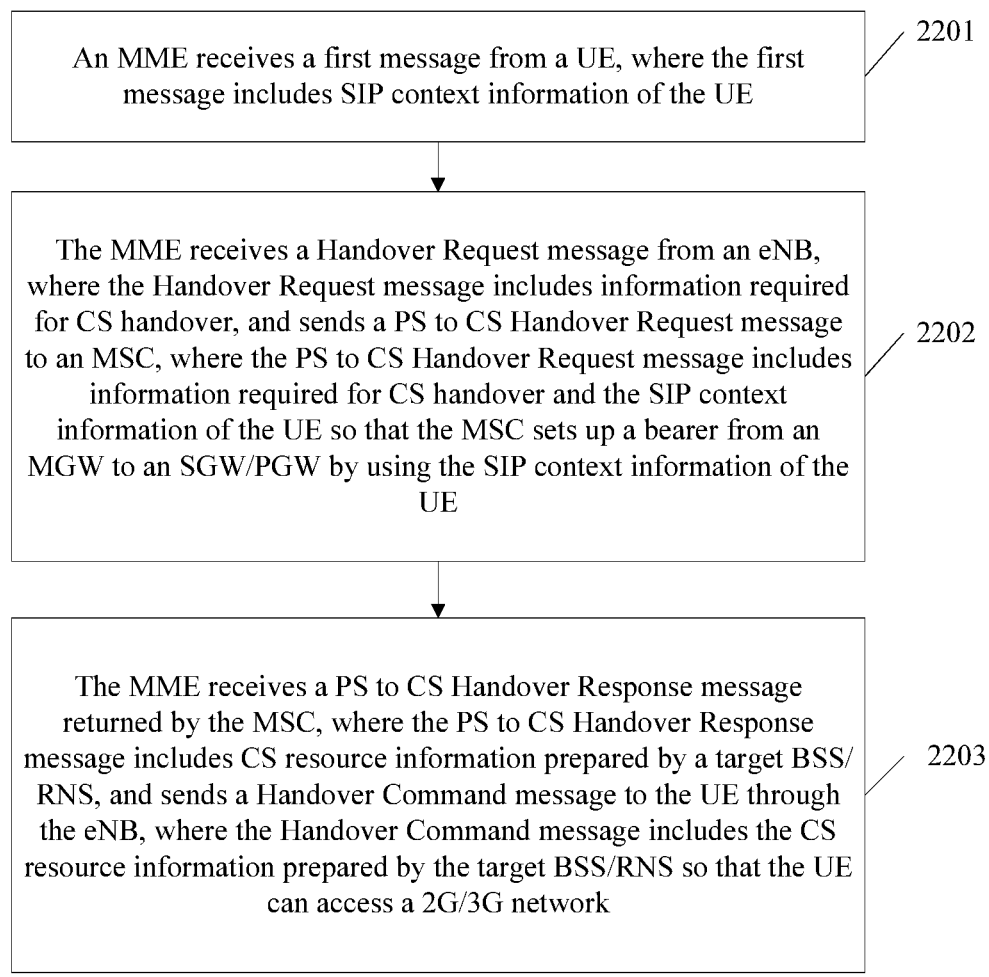
FIG. 22 is a flowchart showing a method for voice call fallback to a CS domain according to a nineteenth embodiment of the present invention.

The following describes a processing procedure of an MME during UE handover. As shown in FIG. 22, the specific steps are as follows:

2201. An MME receives a first message from a UE, where the first message includes SIP context information of the UE.

The first message may be an Extended Service Request message or other messages.

2202. The MME receives a Handover Request message from an eNB, where the Handover Request message includes information required for CS handover, and sends a PS to CS Handover Request message to an MSC, where the PS to CS Handover Request message carries information required for CS handover and the SIP context information of the UE so that the MSC sets up a bearer from an MGW to an SGW/PGW by using the SIP context information of the UE and transmits SIP signaling and media streams on the bearer.

The MSC may set up two bearers from the MGW to the SGW/PGW, and one is used to transmit SIP signaling and the other is used to transmit VoIP media streams. The bearer may be a General Packet Radio Service (GPRS) Tunneling Protocol (GTP) tunnel or a Real-Time Transport Protocol (RTP) bearer.

2203. The MME receives a PS to CS Handover Response message returned by the MSC, where the PS to CS Handover Response message includes CS resource information prepared by a target BSS/RNS, and sends a Handover Command message to the UE through the eNB, where the Handover Command message includes the CS resource information prepared by the target BSS/RNS so that the UE can access a 2G/3G network.

It can be seen that, in this embodiment, the UE reports its SIP context information, and the MME sends the information to the MSC; the MSC may set up a bearer from the MGW to the SGW/PGW by using the SIP context of the UE, so as to set up a transmission path between a CS domain and an IMS domain. In this way, after accessing the 2G/3G network, the UE may directly use the bearer from the MGW to the SGW/PGW set up by the MSC to transmit data streams and SIP signaling of the UE. Compared with the existing method for call fallback to a CS domain, the method in this embodiment may greatly reduce the delay and improve the user experience.

Embodiment 20

Figure 23:
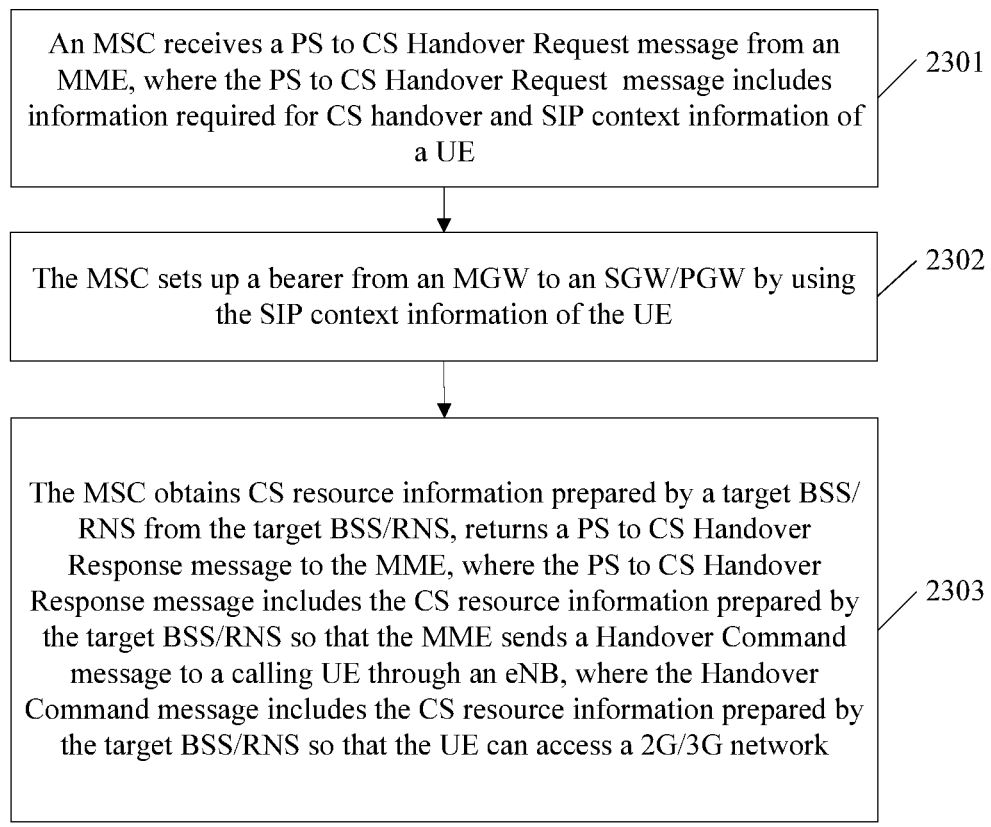
FIG. 23 is a flowchart showing a method for voice call fallback to a CS domain according to a twentieth embodiment of the present invention.

The following describes a processing procedure of an MSC during UE handover. As shown in FIG. 23, the specific steps are as follows:

2301. An MSC receives a PS to CS Handover Request message from an MME, where the PS to CS Handover Request message includes information required for CS handover and SIP context information of a UE, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB.

2302. The MSC sets up a bearer from an MGW to an SGW/PGW by using the SIP context information of the UE so as to transmit SIP signaling and media streams on the bearer.

The MSC may set up a bearer from the MSC to the MGW and to the SGW/PGW and may also set up a bearer from the MGW to the SGW/PGW simultaneously.

2303. The MSC obtains CS resource information prepared by a target BSS/RNS from the target BSS/RNS, returns a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the UE can access a 2G/3G network.

It can be seen that, in this embodiment, the UE reports its SIP context information; the MSC may set up a bearer from the MGW to the SGW/PGW by using the SIP context of the UE, so as to set up a transmission path between a CS domain and an IMS domain. In this way, after accessing the 2G/3G network, the UE may directly use the bearer from the MGW to the SGW/PGW to transmit data streams and SIP signaling of the UE. Compared with the existing method for call fallback to a CS domain, the method in this embodiment may greatly reduce the delay and improve the user experience.

Embodiment 21

Figure 24:
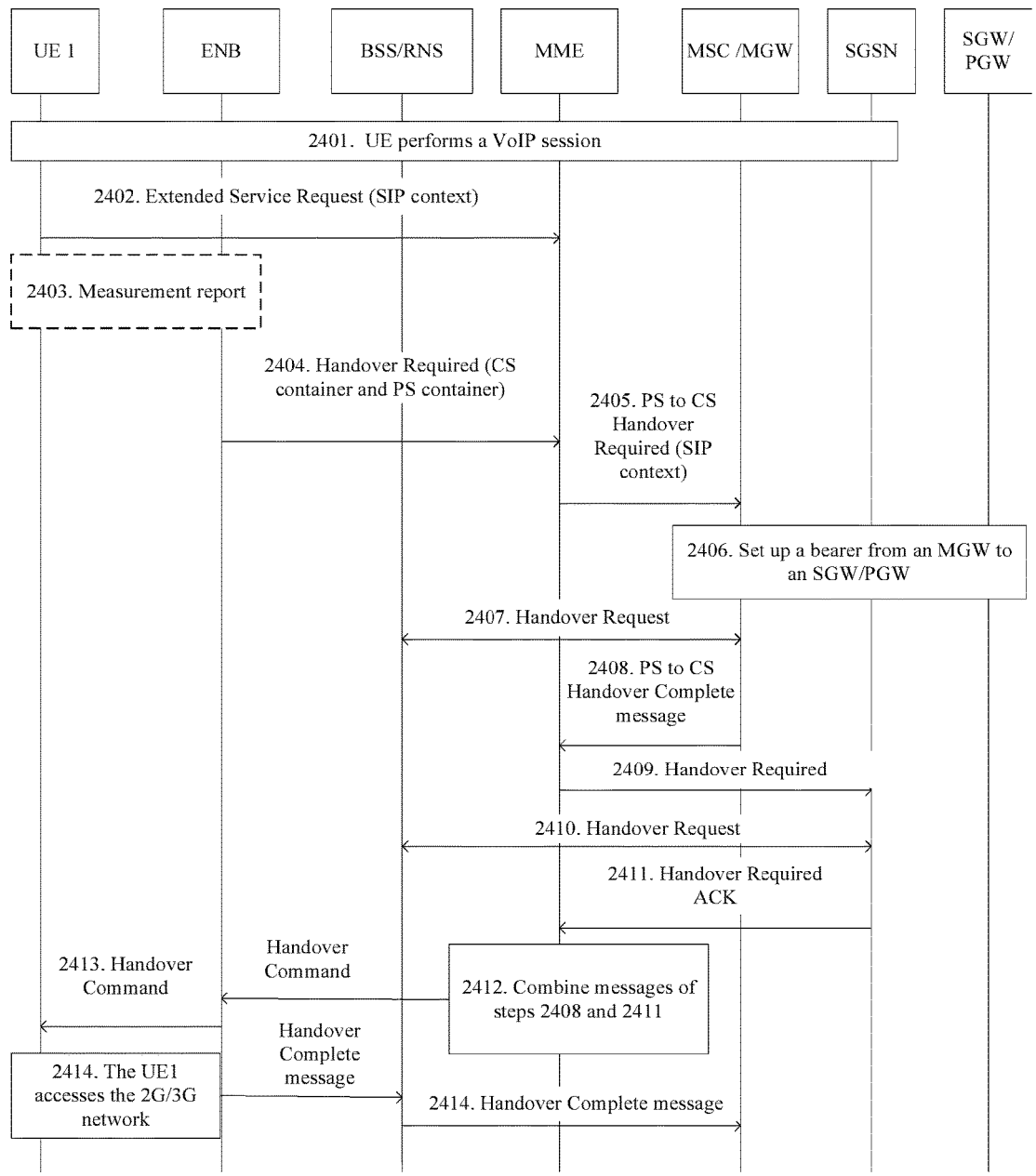
FIG. 24 is a flowchart showing a method for voice call fallback to a CS domain according to a twenty-first embodiment of the present invention.

In this embodiment, a 2G/3G network supports PS handover. The following describes the procedure for voice call fallback to a CS domain in a process where a UE1 is in a VoIP session. As shown in FIG. 24, the specific steps are as follows:

2401. A UE1 performs a voice over internet protocol (VoIP) session in an LTE network.

2402. The UE1 may send an Extended Service Request message to an MME, where the Extended Service Request message may include SIP context information of the UE1 and may further include information such as a CS SETUP Request.

The SIP context of the UE1 may include information such as SIP security related parameters and session related parameters (IP address and port of the peer UE, used encoding or decoding scheme, and packetization interval, and may further include the IP address and port of the UE1).

Furthermore, if the SIP context is updated, the UE1 may use a Service Request message to send an updated SIP context to the MME.

It should be noted that the UE1 may also use other messages to send the SIP context information of the UE1 to the MME, and the specific message is not limited here.

2403. The UE1 measures a 2G/3G network.

In an application scenario, if the UE1 finds that signal quality of the LTE network is degraded, the UE1 may initiate measurement on the 2G/3G network and report a measurement result; if an eNB confirms that the reported signal quality of the 2G/3G network satisfies the preset signal quality requirement, step 2403 is executed.

2404. The eNB sends a Handover Request message to the MME and may add information required for PS handover, information required for CS handover, and the SIP context of the UE1 to the Handover Request message.

The eNB may construct a PS transparent container and a CS transparent container respectively, which are used to bear the information required for PS handover and information required for CS handover respectively. The information required for PS handover encapsulated in the PS transparent container and the information required for CS handover encapsulated in the CS transparent container comply with the existing 2G/3G network specifications and are the target ID of the PS handover and the target ID of the CS handover respectively. The eNB may ensure they are the same.

2405. The MME sends a PS to CS Handover Request message to the MSC, where the PS to CS Handover Request message may include information required for CS handover, SIP context of the UE1, and a CS SETUP Request.

The information required for CS handover may be encapsulated in a CS transparent container, and the MSC is an MSC corresponding to the target cell selected by the UE1 for performing 2G/3G measurement.

2406. The MSC sets up a bearer from an MGW to an SGW/PGW by using the SIP context of the UE1.

In an application scenario, the MSC may set up a bearer for bearing SIP signaling and a bearer for bearing VoIP data streams by using the SIP context of the UE1.

A SIP user agent (UA) function may be built in the MSC. After obtaining SIP context of the UE1 form the MME, the MSC may re-create a SIP context for the UE based on the SIP context of the UE1 obtained from the MME, and further set up a bearer from an MGW to an SGW/PGW. In this way, the SIP signaling may be transmitted from the MSC to the MGW to the SGW/PGW and then to the peer UE, and the VoIP data stream may be transmitted from the MGW to the SGW/PGW and then to the peer UE. The preceding bearer set up may be a GTP-U tunnel.

2407. The MSC instructs a target BSS/RNS to prepare resources for CS handover.

In an application scenario, the MSC may send a Handover Request message to the target BSS/RNS, instructing the target BSS/RNS to prepare resources for CS handover.

2408. The MSC returns a PS to CS Handover Complete message to the MME, where the PS to CS Handover Complete message carries the CS resource information prepared by the target BSS/RNS.

In practice, CS resource information prepared by a target BSS/RNS may include a dedicated air interface channel of a CS voice service and system information, which may be encapsulated in a CS transparent container and comply with the CS domain specifications in the existing 2G/3G network.

2409. The MME initiates PS handover, and sends a Handover Request message to an SGSN, where the Handover Request message includes information required for PS handover.

2410. The SGSN sends a Handover Request message to the target BSS/RNS, and the target BSS/RNS returns the prepared PS resource information.

2411. The SGSN returns a Handover Response message to the MME, where the Handover Response message includes the PS resource information prepared by the target BSS/RNS.

In practice, PS resource information prepared by a target BSS/RNS may include an air interface channel of a PS service and system information, which may be encapsulated in a PS transparent container and comply with the CS specifications in the existing 2G/3G network.

2412. After the messages in steps 2408 and 2411 are received, the MME may combine the two messages and combine the PS resource information and the CS resource information, and sends a Handover Command message to the eNB, where the Handover Command message includes the combined resource information.

In practice, the PS to CS Handover Complete message includes the CS resource information prepared by the target BSS/RNS (mainly including the dedicated air interface channel of the CS voice service and the system information, which are encapsulated in the CS transparent container and comply with the CS domain specifications in the existing 2G/3G network), and the Handover Request ACK message includes PS resource information (mainly including the air interface channel of the PS service and the system information, which are encapsulated in the PS transparent container and comply with the CS specifications in the existing 2G/3G network). The CS transparent container is combined with the PS transparent container to form a combined transparent container, and the combined transparent container is used to bear the resource prepared by the target BSS/RNS.

2413. The eNB sends a Handover Command message to the calling UE, where the Handover Command message includes the resource information prepared by the target BSS/RNS.

2414. The calling UE accesses the 2G/3G network, and sends a Handover Complete message to the target BSS/RNS, and the target BSS/RNS sends a Handover Complete message to the MSC.

After the UE1 is handed over to the 2G/3G network, the bearer points of the voice stream of the UE1 may include network elements from the UE1 to the MSC/MGW to the SGW/PGW and then to the peer UE, and the bearer points of SIP signaling may include network elements from the MSC to the MGW to the SGW/PGW and then to the peer UE.

It can be seen that, in this embodiment, when a UE needs to be handed over to a 2G/3G network, the UE reports its SIP context information, and an MME sends the information to an MSC; the MSC may set up a bearer from an MGW to an SGW/PGW by using the SIP context of the UE, so as to set up a transmission path between a CS domain and an IMS domain. In this way, after the UE accesses the 2G/3G network, the UE may directly transmit its data streams and SIP signaling by using the bearer from the MGW to the SGW/PGW. Compared with the existing method for call fallback to a CS domain, the method in this embodiment may greatly reduce the delay and improve the user experience.

Furthermore, if a 2G/3G network does not support PS handover, a PS service may be suspended with reference to the eighth embodiment; the MSC still sets up a bearer from an MGW to an SWG/PGW by using the SIP context information of the UE.

To better implement the technical solution of the embodiments of the present invention, an embodiment of the present invention further provides an MME.

Embodiment 21

Figure 25:
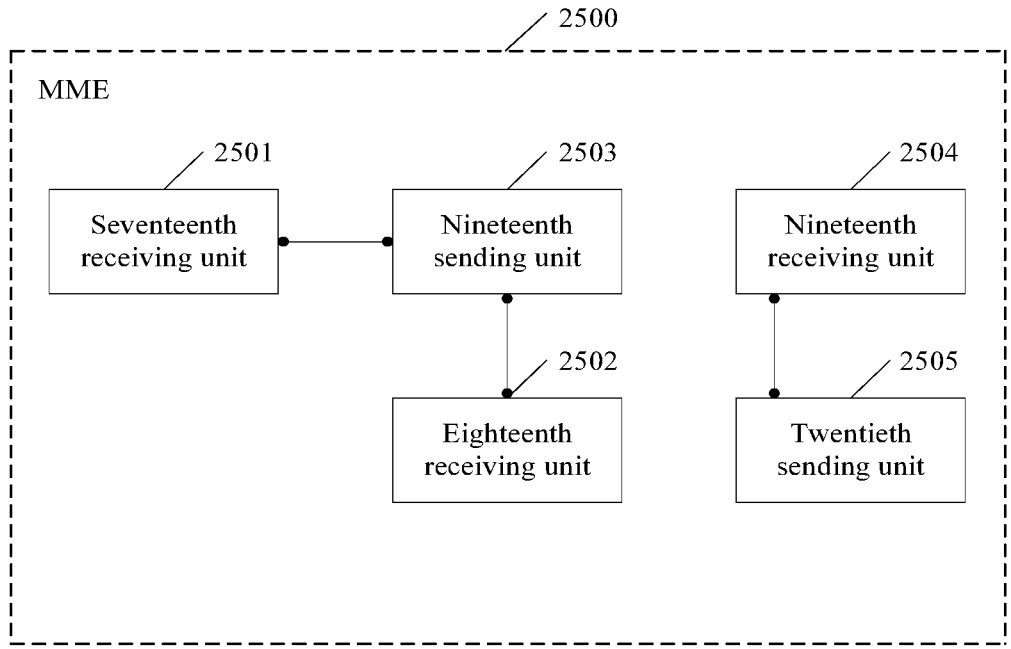
FIG. 25 is a schematic diagram showing a structure of an MME according to a twenty-second embodiment of the present invention.

As shown in FIG. 25, an MME 2500 provided in the twenty-first embodiment may include: a seventeenth receiving unit 2501, an eighteenth receiving unit 2502, a nineteenth sending unit 2503, a nineteenth receiving unit 2504, and a twentieth sending unit 2505.

The seventeenth receiving unit 2501 is configured to receive a first message from a UE, where the first message carries SIP context information of the UE.

The first message may be an Extended Service Request message of the UE or other messages.

The eighteenth receiving unit 2502 is configured to receive a Handover Request message from an eNB, where the Handover Request message includes information required for CS handover.

The nineteenth sending unit 2503 is configured to send a PS to CS Handover Request message to an MSC, where the PS to CS Handover Request message includes the information required for the CS handover and the SIP context information of the UE so that the MSC sets up a bearer from an MGW to an SGW/PGW by using the SIP context information of the UE and transmits SIP signaling and media streams on the bearer.

The nineteenth receiving unit 2504 is configured to receive a PS to CS Handover Response message returned by the MSC, where the PS to CS Handover Response message includes CS resource information prepared by a target BSS/RNS.

The twentieth sending unit 2505 is configured to send a Handover Command message to the UE through the eNB, where the Handover Command message includes the CS resource information prepared by the target BSS/RNS so that the UE can access a 2G/3G network.

It is understandable that, the MME 2500 in this embodiment may be the MME in the preceding embodiments, and may be used to implement all technical solutions of the embodiments; and the function of each functional module may be implemented according to the methods in the preceding embodiments; for the specific implementation process, see the related description in the preceding embodiments, and there is no further description here.

To better implement the technical solution of the embodiments of the present invention, an embodiment of the present invention further provides an MSC.

Embodiment 22

Figure 26:
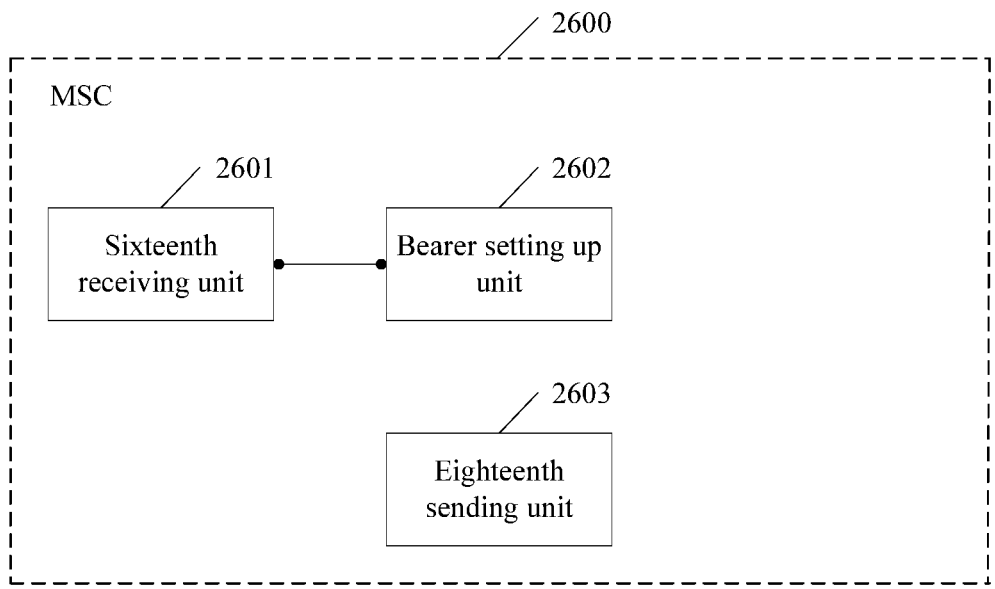
FIG. 26 is a schematic diagram showing a structure of an MSC according to the twenty-second embodiment of the present invention.

As shown in FIG. 26, an MSC 2600 provided in the twenty-second embodiment may include: a sixteenth receiving unit 2601, a bearer setting up unit 2602, and an eighteenth sending unit 2603.

The sixteenth receiving unit 2601 is configured to receive a PS to CS Handover Request message from an MME, where the PS to CS Handover Request message includes information required for CS handover and SIP context information of a UE, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB.

The bearer setting up unit 2602 is configured to set up a bearer from an MGW to an SGW/PGW by using the SIP context information of the UE, so as to transmit SIP signaling and media streams on the bearer.

The bearer setting up unit 2602 may set up a bearer from the MGW to the SGW/PGW and a bearer from the MSC to the MGW and then to the SGW/PGW.

The eighteenth sending unit 2603 is configured to obtain CS resource information prepared by a target BSS/RNS from the target BSS/RNS, and return a PS to CS Handover Response message to the MME, where the PS to CS Handover Response message includes the CS resource information prepared by the target BSS/RNS so that the MME sends a Handover Command message to a calling UE through an eNB, where the Handover Command message includes the CS resource information prepared by the target BSS/RNS so that the UE can access a 2G/3G network.

It is understandable that, the MSC 2600 in this embodiment may be the MSC in the preceding embodiments, and may be used to implement all technical solutions of the embodiments; and the function of each functional module may be implemented according to the methods in the preceding embodiments; for the specific implementation process, see the related description in the preceding embodiments, and there is no further description here.

To better implement the technical solution of the embodiments of the present invention, an embodiment of the present invention further provides a communication system.

Embodiment 23

Figure 27:
FIG. 27 is a schematic diagram showing a structure of a communication system according to a twenty-third embodiment of the present invention.

As shown in FIG. 27, a communication system provided in the twenty-third embodiment may include an MME 2710 and an MSC 2720.

The MME 2710 is configured to: receive a first message from a UE, where the first message includes SIP context information of the UE; receive a Handover Request message from an eNB, where the Handover Request message includes information required for CS handover, and send a PS to CS Handover Request message to the MSC 2720, where the PS to CS Handover Request message includes the information required for the CS handover and the SIP context information of the UE; receive a PS to CS Handover Response message returned by the MSC 2720, where the PS to CS Handover Response message includes CS resource information prepared by a target BSS/RNS, and send a Handover Command message to the UE through the eNB, where the Handover Command message includes the CS resource information prepared by the target BSS/RNS so that the UE can access a 2G/3G network.

The MSC 2720 is configured to: receive the PS to CS Handover Request from the MME, where the PS to CS Handover Request message includes information required for CS handover and SIP context information of the UE, wherein the PS to CS Handover Request message is sent by the MME when the MME receives a Handover Request message from an evolved NodeB (eNB), wherein the Handover Request message is sent by the eNB when the UE sends a Service Request message to instruct the eNB to initiate a CSFB; set up a bearer from an MGW to an SGW/PGW by using the SIP context information of the UE, so as to transmit SIP signaling and media streams on the bearer; obtain CS resource information prepared by a target BSS/RNS from the target BSS/RNS, and return a PS to CS Handover Response message to the MME 2710, where the PS to CS Handover Response message includes the CS resource information prepared by the target BSS/RNS.

It is understandable that, the MME 2710 of the communication system in this embodiment may be the preceding MME 2500, and the MSC 2720 may be the preceding MSC 2600; the function of each functional entity of the communication system in this embodiment may be implemented according to the methods of the preceding embodiments; for the specific implementation process, see the related description in the preceding embodiments, and there is no further description here.

It is understandable to those skilled in the art that all or part of the steps of the preceding embodiments may be implemented by hardware instructed by a computer program. The program may be stored in a computer-readable storage medium. When being executed, the program may perform the procedures provided in the preceding embodiments. The storage medium may be a read only memory (ROM), a random access memory (RAM), a magnetic disk, or a compact disk-read only memory (CD-ROM).

The method, apparatus, and system for voice call fallback to a CS domain have been described in detail in the preceding, and the principle and implementation of the present invention are illustrated through some embodiments. However, the preceding embodiments are only used to help understand the methods and core ideas of the present invention. Meanwhile, it is apparent that those skilled in the art can make various modifications and variations to the invention without departing from the spirit and scope of the invention. In a word, this specification shall not be understood to limit the present invention.

What is claimed is:

1. A method for voice call fallback to a circuit switched (CS) domain, comprising:
   receiving, by a user equipment (UE), a circuit switched (CS) paging request message from a mobility management entity (MME);
   sending, by the UE, a service request message to the MME;
   receiving, by a base station, a circuit switched fallback (CSFB) indication from the MME, wherein the CSFB indication provides instructions for the base station to perform a handover for the UE to a CS domain of a 2nd generation/3rd generation (2G/3G) network;
   transmitting, by the base station, a handover request message to the MME in response to the CSFB indication, wherein the handover request message provides instructions for the MME to transmit a packet switched (PS) to CS handover request message to a mobile switching center (MSC), the PS to CS handover request message provides instructions for the MSC to return a PS to CS handover response message to the MME, wherein the PS to CS handover response message comprises CS resource information prepared by a target base station subsystem/radio network subsystem (BSS/RNS);
   receiving, by the base station, a handover command message from the MME; transmitting, by the base station, the handover command message to the UE; receiving, by the UE, the handover command message from the base station; and accessing, by the UE, the 2G/3G network in accordance with the handover command messages.

2. The method according to claim 1, further comprising:
   sending, by the UE, information indicating whether the UE supports enhanced circuit switched fallback (CSFB) to the MME.

3. The method according to claim 2, wherein the information indicating whether the UE supports enhanced CSFB is carried in an attach request message or a location update message.

4. The method according to claim 1, wherein the handover command message includes CS resource information prepared by a target base station subsystem or radio network subsystem (BSS/RNS).

5. The method according to claim 1, wherein the handover request message comprises information required for the handover to the CS domain.

6. The method according to claim 1, wherein after the base station receives the CSFB indication from the MME and before the base station transmits the handover request message to the MME, the method further comprises:
   soliciting, by the base station, a measurement report for signal quality in the 2G/3G network from the called UE;
   receiving, by the base station, the measurement report; and
   deciding, by the base station, to instruct the MME to initiate the PS to CS handover procedure based on the measurement report and the CSFB indication.

7. A communication system, comprising: a base station and a user equipment (UE):
   the UE, configured to receive a circuit switched (CS) paging request message from a mobility management entity (MME); and send a service request message to the MME;
   the base station, configured to receive a circuit switched fallback (CSFB) indication from the MME, wherein the CSFB indication provides instructions for the base station to perform a handover for the UE to a CS domain of a 2nd generation/3rd generation (2G/3G) network, the base station is further configured to transmit a handover request message to the MME in response to the CSFB indication, wherein the handover request message provides instructions for the MME to transmit a packet switched (PS) to CS handover request message to a mobile switching center (MSC), wherein the PS to CS handover request message provides instructions for the MSC to return a PS to CS handover response message to the MME, the PS to CS handover response message comprises CS resource information prepared by a target base station subsystem/radio network subsystem (BSS/RNS), and the base station is further configured to receive a handover command message from the MME, to transmit the handover command message to the UE; and the UE, further configured to receive the a handover command message from the base station; and to access the 2G/3G network in accordance with the handover command messages.

8. The system non transitory computer readable medium according to claim 7:
   wherein the UE is further configured to send information indicating whether the UE supports enhanced circuit switched fallback (CSFB) to the MME.

9. The system according to claim 8, wherein the information indicating whether the UE supports enhanced CSFB is carried in an attach request message or a location update message.

10. The system according to claim 7, wherein the handover command message includes CS resource information prepared by a target base station subsystem or radio network subsystem (BSS/RNS).

11. The system according to claim 7, wherein the handover request message comprises information required for the handover to the CS domain.

12. The system according to claim 7, wherein the base station is further configured to after the base station receives the CSFB indication from the MME and before the base station transmits the handover request message to the MME,
   solicit a measurement report for signal quality in the 2G/3G network from the called UE;
   receive the measurement report; and
   decide to instruct the MME to initiate the PS to CS handover procedure based on the measurement report and the CSFB indication.

13. The system according to claim 7, wherein the system further comprises the MME.

14. The system according to claim 13, wherein the MME is configured to receive the handover request message from the base station, to transmit the PS to CS handover request message to the MSC, to receive, from the MSC, a response to the PS to CS handover request and to transmit the handover command message to the base station.

15. The system according to claim 7, wherein the system further comprises the MSC.

* * * * *